United States Patent
Jain et al.

(10) Patent No.: US 10,990,441 B2
(45) Date of Patent: Apr. 27, 2021

(54) MULTI-LEVEL JOB PROCESSING QUEUES

(71) Applicant: Nutanix, Inc., San Jose, CA (US)

(72) Inventors: Kshitiz Jain, Bengaluru (IN); Prateek Kajaria, Bengaluru (IN)

(73) Assignee: Nutanix, Inc., San Jose, CA (US)

( * ) Notice: Subject to any disclaimer, the term of this patent is extended or adjusted under 35 U.S.C. 154(b) by 268 days.

(21) Appl. No.: 16/051,254

(22) Filed: Jul. 31, 2018

(65) Prior Publication Data
US 2020/0042349 A1 Feb. 6, 2020

(51) Int. Cl.
G06F 9/48 (2006.01)
G06F 9/455 (2018.01)
G06F 9/54 (2006.01)

(52) U.S. Cl.
CPC ........ *G06F 9/4881* (2013.01); *G06F 9/45558* (2013.01); *G06F 9/546* (2013.01); *G06F 2009/45575* (2013.01)

(58) Field of Classification Search
CPC .... G06F 9/4881; G06F 9/45558; G06F 9/546; G06F 2009/45575
See application file for complete search history.

(56) References Cited

U.S. PATENT DOCUMENTS

| 6,986,139 B1* | 1/2006 | Kubo ...................... G06F 9/505 709/223 |
| 8,549,518 B1 | 10/2013 | Aron et al. |
| 8,601,473 B1 | 12/2013 | Aron et al. |
| 8,799,554 B1* | 8/2014 | Vincent ................ G06F 9/5016 711/6 |
| 8,850,130 B1 | 9/2014 | Aron et al. |
| 9,772,866 B1 | 9/2017 | Aron et al. |
| 2009/0122706 A1* | 5/2009 | Alfano ............... H04L 41/5003 370/237 |
| 2017/0192892 A1* | 7/2017 | Pundir ............... G06F 12/0873 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Emerson C Puente
*Assistant Examiner* — Jonathan R Labud
(74) *Attorney, Agent, or Firm* — Vista IP Law Group LLP

(57) ABSTRACT

Systems and methods for scheduling job requests in a virtualization system. A method embodiment commences upon initialization of a pair of multi-level queues comprising a high priority job queue and a low priority job queue. A plurality of virtual machines issue job requests. Queue management logic receives incoming job requests from the virtual machines and locates or creates a job request group corresponding to the virtual machine of the incoming job request. The incoming job request is positioned into the job request group and the job request group is positioned into a queue. When a job executor is ready for a next job, then a job for execution can be identified by locating a next job in a next job request group that is at the front of either the high priority queue or at the front of the low priority queue. When a job finishes, the queues are reorganized.

21 Claims, 31 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication late based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication late based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
"Throttle API Requests for Better Throughput" (May 15, 2018), Amazon Web Services, Inc. https://docs.aws.amazon.com/apigateway/latest/developerguide/api-gateway-request-throttling.html.
Cano, I. et al., "Curator: Self-Managing Storage for Enterprise Clusters", 14th USENIX Symposium on Networked Systems Design and Implementation, NSDI '17, (Mar. 27, 2017).

* cited by examiner

MULTI-LEVEL JOB PROCESSING QUEUES

FIELD

This disclosure relates to computing systems, and more particularly to techniques for multi-level job processing queues.

BACKGROUND

The resource usage efficiencies delivered by modern distributed computing systems has resulted in continually increasing deployments and usage of such systems, especially computing systems that support virtualized entities (VEs) to facilitate even greater efficiencies of resource utilization. The VEs in such virtualization environments abstract portions of the underlying physical computing resources. For example, certain portions of the physical hard disk drives (HDDs) and/or solid-state drives (SSDs) of a computing node or "node" might be abstracted to one or more "virtual disks" (vDisks).

Any of the foregoing VEs can be implemented in virtualization environments to facilitate execution of one or more workloads. Some configurations of distributed virtualization systems might scale to hundreds of nodes or more that support several thousand or more VEs that perform such workloads. For example, a VM might be created to operate as an SQL server, while another VM might be created to support a virtual desktop infrastructure (VDI). The VEs issue requests to access the underlying computing resources of the system so as to perform certain "jobs" (e.g., tasks, operations, processes, etc.) associated with their workloads. The jobs might pertain to storage input or output (I/O or IO) operations, network communications, data processing, and/or other tasks that consume the resources of the system. As the underlying computing resources consumed by the jobs are limited, situations can arise in which contention develops with respect to the priority of execution of the job requests from the VEs. More specifically, one job might continuously demand computing resources while other jobs get starved for resources.

Unfortunately, conventional approaches to managing such contention between the job requests of the VEs are deficient. For example, a first-in first-out (FIFO) job request processing queue might process several job requests issued nearly concurrently by a first VM, while merely one job request later issued by a second VM might need to wait until some or all of the jobs of the first VM are complete before being processed. This situation is exacerbated if the jobs from the first VM have a longer latency (e.g., I/O operations over an HDD) and the job from the second VM has a shorter latency (e.g., I/O operations over an SSD).

Some approaches attempt to address this issue by allocating fixed portions of the computing resources available to the first VM and second VM (e.g., allocate 50% of an IOPS maximum limit to each VM). However, with this approach, although the resources available to each VM are uniformly divided, the approach fails to consider the then-current resource consumption of the VMs. For example, the first VM might begin executing a lighter workload that demands fewer computing resources (e.g., fewer I/O operations) than earlier demanded, whereas the second VM might begin executing a heavier workload that demands more computing resources (e.g., more I/O operations) than earlier demanded. With the foregoing fixed allocations of computing resources, the second VM may now experience a negative impact on performance (e.g., I/O latency). What is needed is a technological solution for scheduling job requests of virtualized entities.

SUMMARY

The present disclosure describes techniques used in systems, methods, and in computer program products for multi-level job processing queues, which techniques advance the relevant technologies to address technological issues with legacy approaches. More specifically, the present disclosure describes techniques used in systems, methods, and in computer program products for multi-level job queues for scheduling jobs in virtualization environments. Certain embodiments are directed to technological solutions for actively positioning job requests over two or more job queues having respective prioritization levels to facilitate a balanced processing order of jobs invoked by virtualized entities in a virtualization environment.

The disclosed embodiments modify and improve over legacy approaches. In particular, the herein-disclosed techniques provide technical solutions that address the technical problems attendant to managing contention for resources between virtualized entities that considers the then-current resource consumption of the virtualized entities. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of high performance computing as well as advances in various technical fields related to operating system scheduling.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
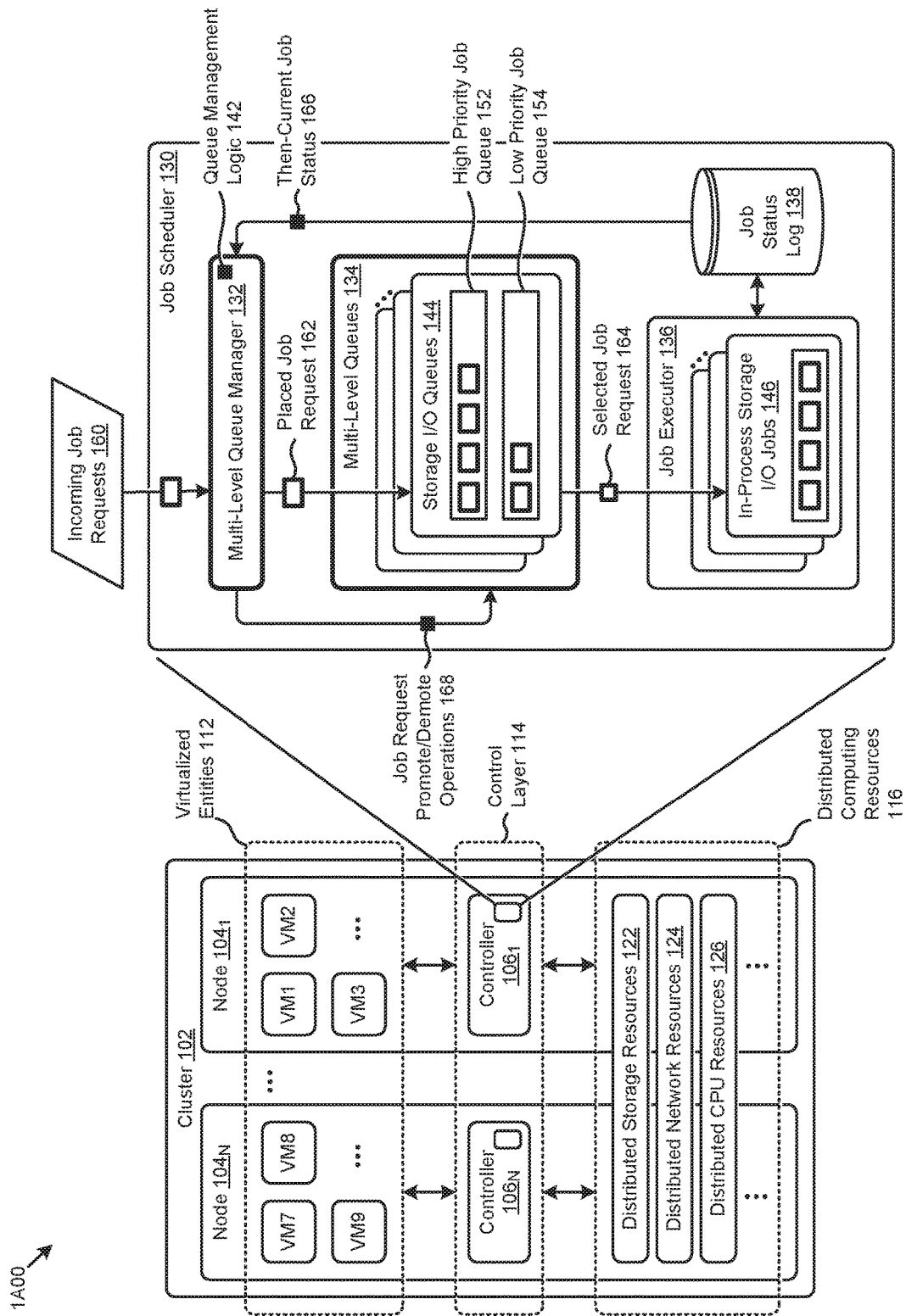
FIG. 1A illustrates a computing environment in which embodiments of the present disclosure can be implemented.

Embodiments in accordance with the present disclosure address the problem of managing contention for resources between virtualized entities that considers the then-current resource consumption of the virtualized entities. Some embodiments are directed to approaches for actively positioning job requests over two or more job queues having respective prioritization levels to facilitate a balanced processing order of jobs invoked by virtualized entities in a virtualization environment. The accompanying figures and discussions herein present example environments, systems, methods, and computer program products for multi-level job queues for scheduling jobs in virtualization environments.

Overview

Disclosed herein are techniques for actively positioning job requests over two or more job queues having respective prioritization levels to facilitate a balanced processing order of jobs invoked by virtualized entities (e.g., virtual machines or VMs) in a virtualization environment. In certain embodiments, at least a high priority job queue and a low priority job queue are implemented. Each job request positioned in the queues is identified at least in part by the particular VM that issued the request. The job requests associated with a particular VM are grouped within the queues. A set of queue management logic is consulted to place incoming job requests from the VMs in one of the queues. For example, a job request from a VM having no other pending or processing jobs is added to the high priority job queue in a newly formed group associated with the VM. A job request issued from a VM having an existing job request group in the low priority job queue is added to the end of that job request group in the low priority job queue. Other variations are possible as determined by the queue management logic and/or the organization of the queues (e.g., number of prioritization levels).

The queue management logic is applied to the then-current job processing status to perform certain demote operations and/or promote operations that move selected job request groups between the high priority job queue and the low priority job queue. When computing resources are available to process a job, the job request at the head of the high priority job queue is selected for processing. If there is no job request in the high priority job queue, the job request at the head of the low priority job queue is selected for processing. In certain embodiments, an in-process jobs threshold is accessed by the queue management logic to facilitate the demote operations and/or the promote operations. In certain embodiments, instances of the high priority job queue and the low priority job queue are implemented for respective sets of computing resources.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a computing environment 1A00 in which embodiments of the present disclosure can be implemented. As an option, one or more variations of computing environment 1A00 or any aspect thereof may be implemented in the context of the architecture and functionality of the embodiments described herein.

FIG. 1A illustrates one aspect pertaining to actively positioning job requests over two or more job queues having respective prioritization levels to facilitate a balanced processing order of jobs invoked by virtualized entities in a virtualization environment. Specifically, the figure presents a logical depiction of how the herein disclosed techniques can be implemented in a computing environment (e.g., a virtualization environment) to perform job scheduling using multi-level job queues.

The logical depiction of FIG. 1A illustrates a computing cluster (e.g., cluster 102) that comprises a plurality of computing nodes (e.g., node $104_1$, ..., node $104_N$) that are configured to operate in accordance with a virtualization regime. As such, various instances of virtualized entities 112 (e.g., virtual machines VM1, VM2, VM3, ..., VM7, VM8, VM9, etc.) are implemented at the nodes of cluster 102. As can be observed, the virtualized entities 112 access a set of distributed computing resources 116 (e.g., distributed storage resources 122, distributed network resources 124, distributed CPU resources 126, etc.) at cluster 102 through a control layer 114. The control layer 114 can be facilitated by an instance of a controller (e.g., controller $106_1$, ..., controller $106_N$) at each of the nodes. The controllers in control layer 114 might be implemented as a virtual machine (VM) as an executable container (e.g., a Docker container), or within a hypervisor at the node.

When the controllers are implemented as virtual machines, the virtualized entities at a particular node can interface with a respective controller through a hypervisor at the node. When the controllers are VMs running above the hypervisors, varying virtual machine architectures and/or hypervisors can operate with cluster 102. When the controllers are implemented as executable containers (e.g., Docker containers), the virtualized entities at a particular node can interface with a respective controller through a hypervisor and/or the kernel of a host operating system at the node.

Such interactions between the virtualized entities 112 and controllers comprising the control layer 114 often pertain to requests to access the underlying computing resources (e.g., distributed computing resources 116) of cluster 102 so as to perform certain "jobs" (e.g., tasks, operations, processes, etc.) associated with the virtualized entities 112. The jobs might pertain to storage input or output (I/O or IO) operations over the distributed storage resources 122, network communications over the distributed network resources 124, data processing over the distributed CPU resources 126, and/or other tasks that consume the distributed computing resources 116. As the distributed computing resources 116 consumed by the jobs are limited, situations can arise in which contention develops with respect to the priority of execution of the job requests from the virtualized entities 112.

The herein disclosed techniques address such problems attendant to managing contention for resources between virtualized entities by actively positioning job requests over two or more job queues having respective prioritization levels to facilitate a balanced processing order of jobs invoked by the virtualized entities. Specifically, and as shown in FIG. 1A, a job scheduler 130 can receive one or more incoming job requests 160 (e.g., from virtualized entities 112) at a multi-level queue manager 132. A set of queue management logic 142 implemented at multi-level queue manager 132 is consulted to place each instance (e.g., placed job request 162) of the incoming job requests 160 in one of a set of multi-level queues 134. As can be observed, the multi-level queues 134 can comprise a plurality of sets of multiple queues. Specifically, a set of storage I/O queues 144 might comprise a high priority job queue 152 and a low priority job queue 154. In some cases, each set of multiple queues might correspond to a particular type of computing resource (e.g., storage, network, CPU, etc.) associated with job requests contained in the set of multiple queues. Each set of multiple queues might comprise two (e.g., as shown in storage I/O queues 144) or more queues of respective priority levels.

A job executor 136 at job scheduler 130 accesses the multi-level queues 134 to select job requests (e.g., selected job request 164) for processing at cluster 102. Various sets of in-process jobs can be managed by job executor 136. In some cases, each set of in-process jobs might correspond to a particular type of computing resource (e.g., storage, network, CPU, etc.) associated with the in-process jobs. For example, a set of in-process storage I/O jobs 146 might comprise in-process jobs operate over the distributed storage resources 122 of cluster 102. When computing resources are available to process a job, the job request at the head of the high priority job queue is selected for processing by job executor 136. If there is no job request in the high priority job queue, the job request at the head of the low priority job queue is selected for processing by the job executor 136. The job executor 136 further maintains a job status log 138. The job status log 138 comprises data records that describe the job status of in-process jobs and/or earlier processed jobs.

The job status log 138 and/or other information are accessed by multi-level queue manager 132 to manage the content (e.g., job requests) of the multi-level queues 134 so as to facilitate a balanced selection of job requests by job executor 136. Specifically, data records from job status log 138 that describe a then-current job status 166 are applied to queue management logic 142 to invoke certain job request promote and/or demote operations (e.g., job request promote/demote operations 168) over the multi-level queues 134. Such promote/demote operations might, for example, "promote" one or more job requests from the low priority job queue 154 to the high priority job queue 152 or "demote" one or more job requests from the high priority job queue 152 to the low priority job queue 154. In certain embodiments, job requests in the multi-level queues 134 are placed in job request groups that correspond to the virtualized entity (e.g., VM) that issued the job requests. In this case, an entire job request group, together with its then-current contents might be promoted and/or demoted from one queue to another queue.

Such balanced selection of job requests facilitated by the herein disclosed techniques improves the utilization of the distributed computing resources 116 of cluster 102, or the computing resources of any computing system. Specifically, application of the herein disclosed multi-level job processing queues facilitates dynamic selection of job requests based at least in part a then-current job status, thereby eliminating an underutilization of computing resources introduced by certain fixed resource allocation approaches.

One embodiment of a multi-level queue structure is disclosed in further detail as follows.

Figure 1B:
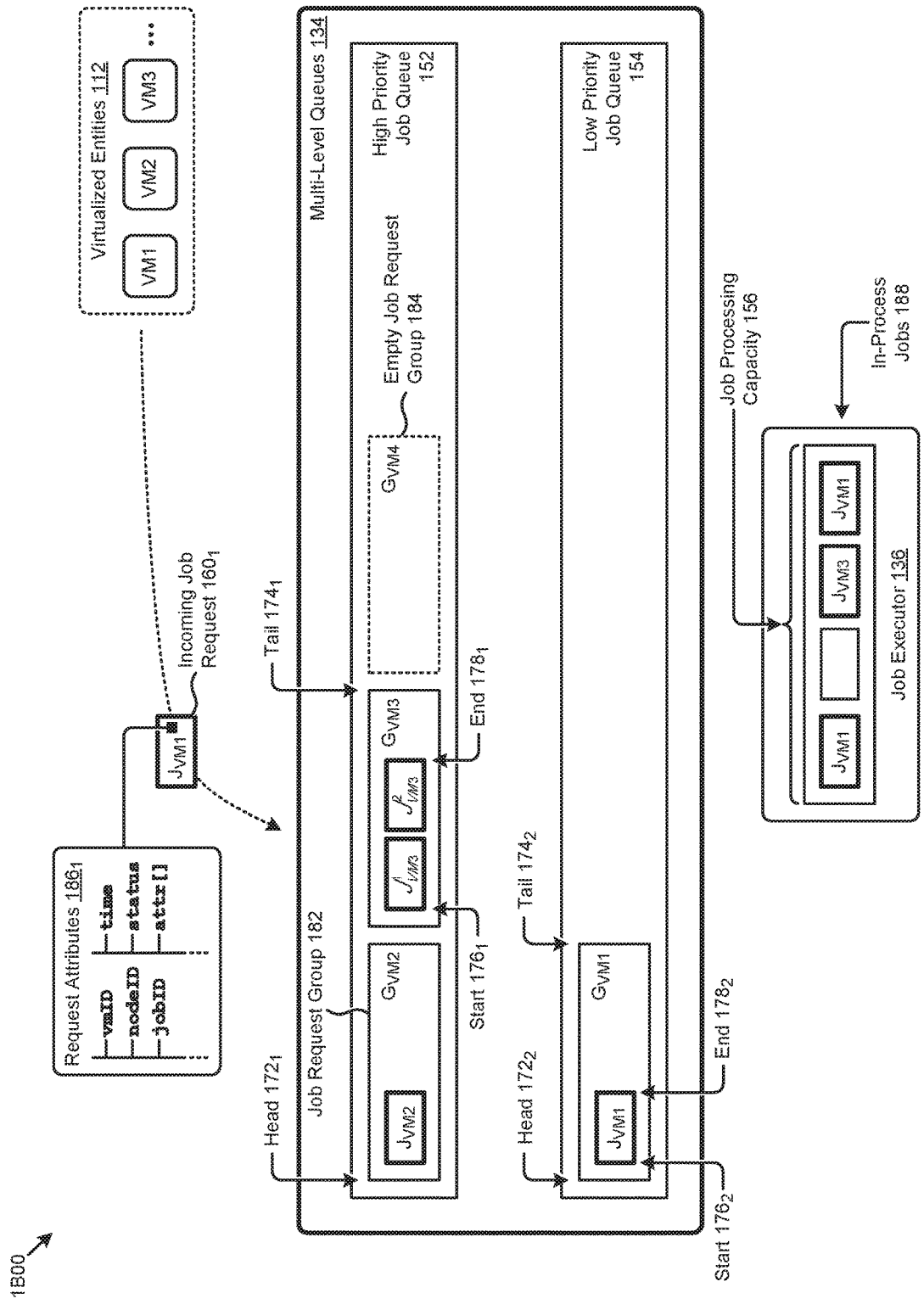
FIG. 1B depicts a multi-level queue structure as used in systems that implement multi-level job queues for scheduling jobs in virtualization environments, according to an embodiment.

FIG. 1B depicts a multi-level queue structure 1B00 as used in systems that implement multi-level job queues for scheduling jobs in virtualization environments. As an option, one or more variations of job queuing and processing technique 200 or any aspect thereof may be implemented in the context of the architecture and functionality of the embodiments described herein. The job queuing and processing technique 200 or any aspect thereof may be implemented in any environment.

FIG. 1B illustrates one aspect pertaining to actively positioning job requests over multi-level queues (e.g., two or more queues having respective prioritization levels) to facilitate a balanced processing order of jobs invoked by virtualized entities in a virtualization environment. Specifically, the figure is being presented to illustrate various characteristics of one embodiment of a multi-level queue structure. A specialized job request data structure designed to improve the way a computer stores and retrieves data in memory is also presented.

As shown in FIG. 1B, the aforementioned characteristics of the multi-level queue structure are illustrated as pertaining to the high priority job queue 152 and the low priority job queue 154 of the multi-level queues 134. Specifically, the foregoing queues comprise instances of job request groups (e.g., job request group 182) that may or may not contain one or more job requests. As indicated by the job request group identifiers (e.g., $G_{VM1}$, $G_{VM2}$, $G_{VM3}$, and $G_{VM4}$), each job request group corresponds to a particular one of the virtualized entities 112 (e.g., VM1, VM2, VM3, etc.). In many cases, the job request groups comprise one or more instances of job requests (e.g., one or more instances of $J_{VM1}$, $J_{VM2}$, $J_{VM3}^1$, $J_{VM3}^2$, etc.) issued by respective instances of the virtualized entities 112.

Each of the high priority job queue 152 and the low priority job queue 154 has a "head" position and a "tail" position. The head of a queue (e.g., head $172_1$ and head $172_2$) is the position of the first job request and/or first job request group (if any) in the queue. The tail of a queue (e.g., tail $174_1$ and tail $174_2$) is the position that follows the last job request and/or last populated job request group (if any) in the queue. If a queue is empty, the head and tail define equivalent positions. In this case, for example, positioning a populated job request group at the "tail" of an empty queue might be the same operation as positioning the job request group at the "head" of the queue. Within a job request group are a "start" position and an "end" position. The start of a job request group (e.g., start $176_1$ and start $176_2$) is the first job request position of the job request group, and the end of the job request group (e.g., end $178_1$ and end $178_2$) is the last job request position of the job request group.

In certain embodiments, a queue might be implemented as a logical sequence of memory storage locations that store "pointers" to the job requests and/or job request groups that are contained in the queue. In some cases, such pointers might comprise job identifiers or group identifiers associated with the job requests or job request groups, respectively, that are stored in the memory locations. In other cases, a pointer might be a memory address of an object associated with the job request or job request group. In any case, the position of a particular a job request or job request group in the queue is represented by the position of its respective pointer in the logical sequence of memory storage locations.

As earlier indicated, specialized job request data structures are used to improve the way a computer stores and retrieves data in memory (e.g., for ongoing queue management). Specifically, a queue might be implemented by a collection of first-in, first-out (FIFO) data structures that are implemented in hardware or software or both. In such cases a job request group is assigned to a corresponding FIFO, and other data structures such as linked lists represent the ordering of job requests groups in the queues. When FIFOs are used to maintain an order for processing the jobs in a job request group, moving a job request group from one position in a queue to another position in a queue can be done with pointers. For example, there can be one linked list for the high priority queue and a second linked list for the low priority queue. Moving a job request group within a queue, and/or demoting a job request group from a high priority queue to a lower priority queue and/or promoting a job request group from a lower priority queue to a high priority queue can be accomplished merely by adjusting entries in the linked lists.

As indicated in the shown set of request attributes $186_1$ associated with an incoming job request $160_1$, the aforementioned job identifier might be included in a job request message issued by a virtualized entity (e.g., VM1). Specifically, request attributes $186_1$ indicates a particular job request might describe a VM identifier (e.g., stored in a "vmID" field), a node identifier (e.g., stored in a "nodeID" field), a job identifier (e.g., stored in a "jobID" field), a timestamp (e.g., stored in a "time" field), a job status and/or request status description (e.g., stored in a "status" field), a set of job attributes and/or parameters (e.g., stored in an "attr[ ]" object), and/or other request attributes. A data structure that describes a job request group might comprise a group identifier and instances of request attributes, such as request attributes $186_1$, that correspond to the job requests contained in the job request group. In some cases, and as illustrated in an empty job request group 184, a job request group might exist at some particular moment in time, but with no associated job request at that moment in time.

The jobs associated with respective job requests that are selected (e.g., by job executor 136) for processing are represented in FIG. 1B as a set of in-process jobs 188. In the shown representative embodiment, the three in-process jobs 188 at job executor 136 that consume three of four total job processing slots that comprise a job processing capacity 156.

One embodiment of techniques for job queuing and processing using multi-level job queues is disclosed in further detail as follows.

Figure 2:
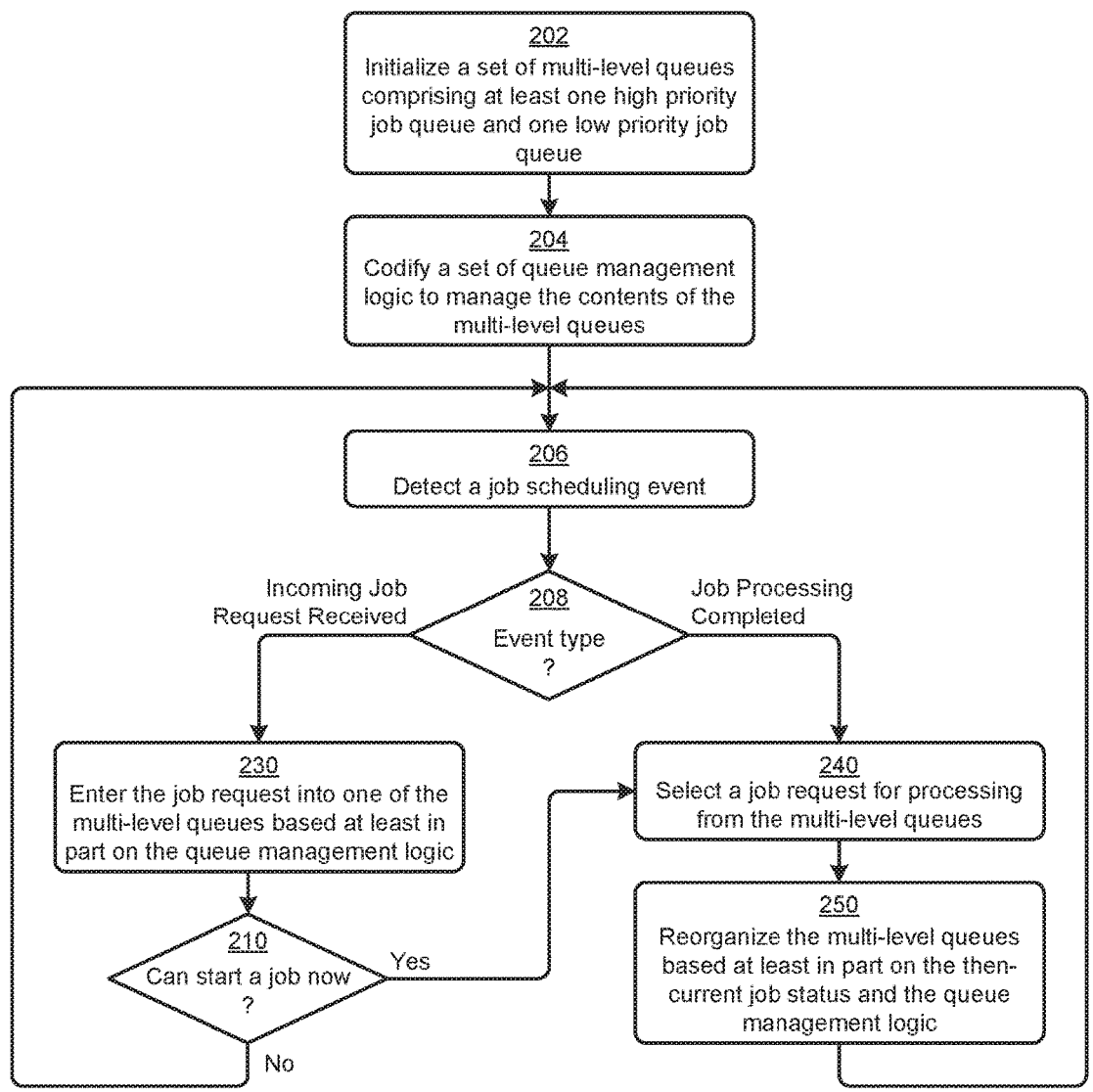
FIG. 2 depicts a job queuing and processing technique as used in systems that implement multi-level job queues for scheduling jobs in virtualization environments, according to an embodiment.

FIG. 2 depicts a job queuing and processing technique 200 as used in systems that implement multi-level job queues for scheduling jobs in virtualization environments. As an option, one or more variations of job queuing and processing technique 200 or any aspect thereof may be implemented in the context of the architecture and functionality of the embodiments described herein. The job queuing and processing technique 200 or any aspect thereof may be implemented in any environment.

FIG. 2 illustrates one aspect pertaining to actively positioning job requests over two or more job queues having respective prioritization levels to facilitate a balanced processing order of jobs invoked by virtualized entities in a virtualization environment. Specifically, the figure presents one embodiment of certain steps and/or operations that facilitate queueing and processing job requests using multi-level job queues.

The job queuing and processing technique 200 can commence by initializing a set of multi-level queues that comprise at least a high priority job queue and a low priority job queue (step 202). As earlier mentioned a job type might correspond to the class of computing resources (e.g., storage resources, networking resources, CPU resources, etc.) that are primarily consumed by jobs processed in the virtualization environment. In some cases, a job is an I/O operation, such as a storage I/O operation or a network I/O operation.

Queue management logic and corresponding metadata is codified to aid in managing the contents of the multi-level queues (step 204). The queue management logic might be implemented in various instances of a controller (e.g., controller VM) at the virtualization environment as earlier described. The content of the multi-level queues can comprise job request and/or job request groups and/or other information pertaining to jobs and/or job requests processed in the virtualization environment. The queue management logic and corresponding metadata might be implemented using any combination of hardware and software, and/or any combination of hardware data structures (e.g., hardware FIFOs) and/or software data structures (e.g., linked lists, pointers, hash tables, etc.). For handling different types of jobs (e.g., storage I/O jobs, network I/O jobs, etc.), different sets of multi-level queues and corresponding metadata might be initialized for each job type. Alternatively, jobs of different types can be managed within one pair of queues. As such, the queue management logic and corresponding metadata might include logic and metadata to facilitate identification a particular job type that corresponds to any entry in any queue.

At certain moments in time, a job scheduling event is detected (step 206). For example, a job scheduling event might pertain to receiving an incoming job request issued from a virtualized entity, or a job processing completion event signaled by a job executor. If an incoming job request is received (see "Incoming Job Request Received" path of decision 208), then the job request is entered into one of the multi-level queues based at least in part on the queue management logic (step 230). For example, the queue management logic might enter the incoming job request in the high priority job queue or the low priority job queue based at least in part on the VM identifier associated with the job request. If there is no then-current processing capacity to start another job (see "No" path of decision 210), the flow returns to detection of a job scheduling event (step 206).

If there is processing capacity available (see "Yes" path of decision 210) after entering an incoming job request into one of the multi-level queues or as indicated by a job processing completion event (see "Job Processing Completed" path of decision 208), then a job request is selected for processing from the multi-level queues (step 240). For example, a job request at the head of the high priority job queue or the low priority job queue might be selected for processing. The multi-level queues are reorganized based at least in part on the then-current job status and/or the queue management logic (step 250). As earlier mentioned, management of the multi-level queues facilitates a fair and balanced selection of job requests from the multi-level queues. As an example, the then-current job status might indicate that a particular VM has a high number of in-process jobs. In this case, applying the queue management logic to the then-current job status might invoke a demotion of any pending job requests for that VM to the low priority job queue to prioritize job requests of other VMs (e.g., in the high priority job queue) over the job requests of the VM with a high number of in-process jobs.

The foregoing discussions include techniques for entering incoming job requests into the multi-level queues (e.g., step 230 of FIG. 2), which techniques are disclosed in further detail as follows.

Figure 3:
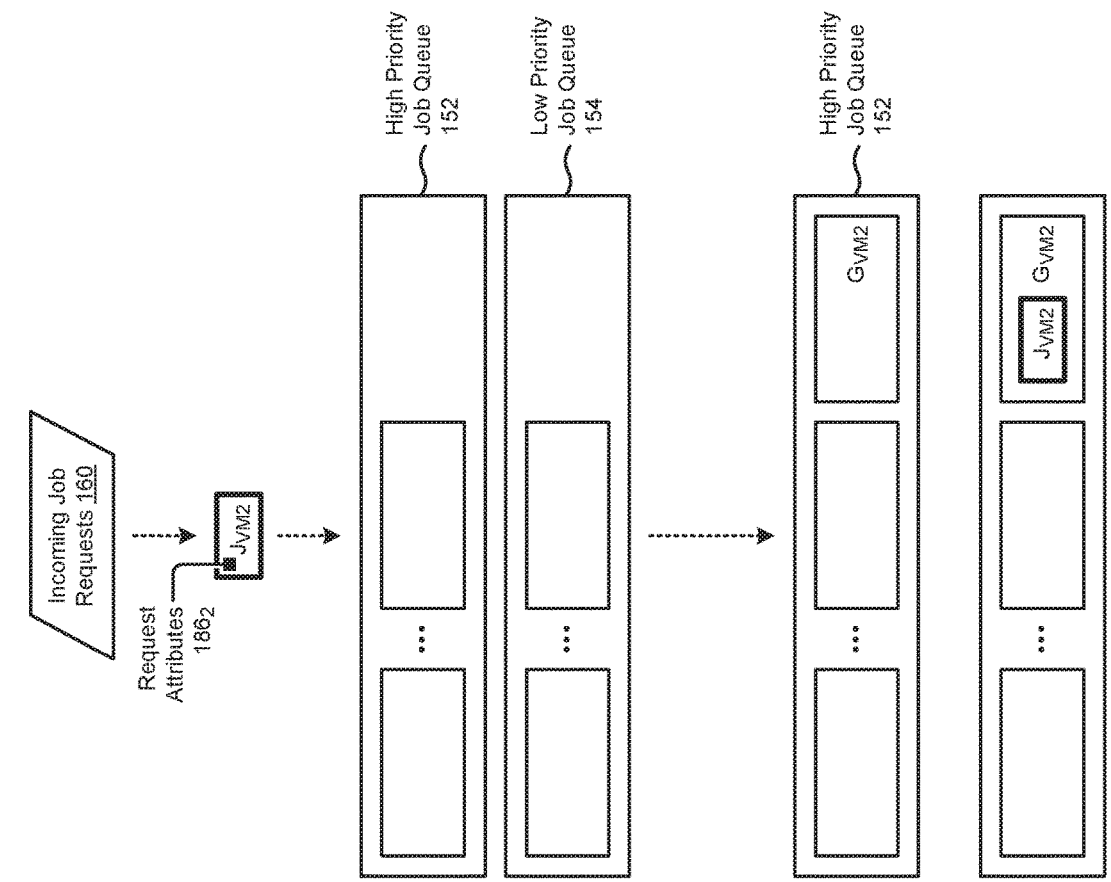
FIG. 3 presents a job request queue placement technique as used in systems that implement multi-level job queues for scheduling jobs in virtualization environments, according to an embodiment.
Figure 3:
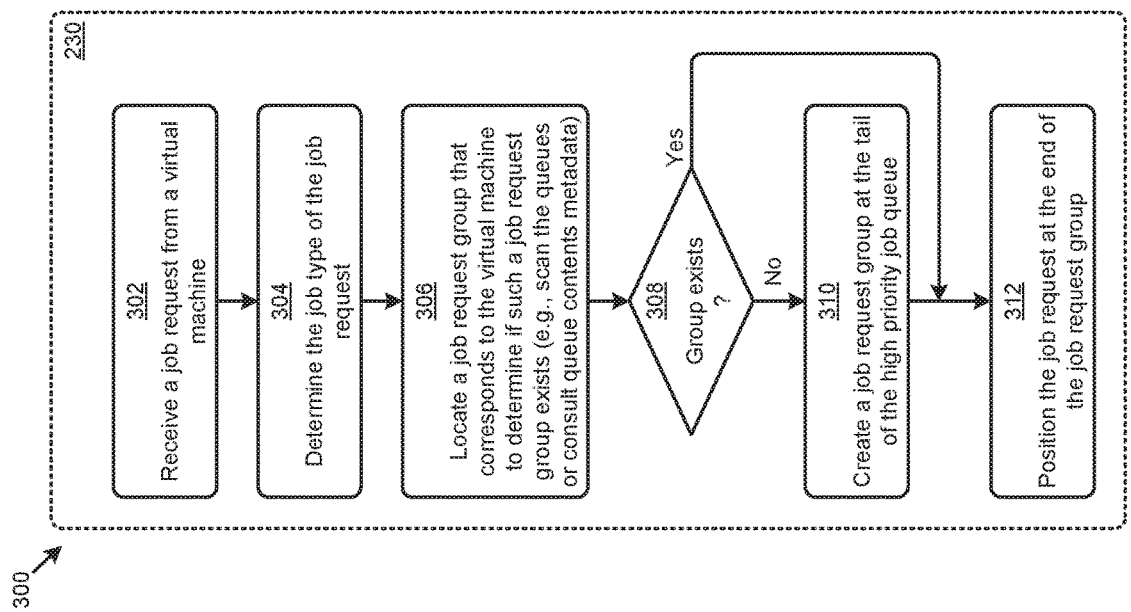

FIG. 3 presents a job request queue placement technique 300 as used in systems that implement multi-level job queues for scheduling jobs in virtualization environments. As an option, one or more variations of job request queue placement technique 300 or any aspect thereof may be implemented in the context of the architecture and functionality of the embodiments described herein. The job request queue placement technique 300 or any aspect thereof may be implemented in any environment.

FIG. 3 illustrates one aspect pertaining to actively positioning job requests over two or more job queues having respective prioritization levels to facilitate a balanced processing order of jobs invoked by virtualized entities in a virtualization environment. Specifically, the figure is presented to illustrate one embodiment of certain steps and/or operations for entering incoming job requests into one of a set of multi-level queues. Certain illustrations are also shown in the figure to depict example applications of the job request queue placement technique 300.

The job request queue placement technique 300 can commence by receiving a job request from a virtual machine (step 302). As illustrated, a job request received from incoming job requests 160 might be a job request $J_{VM2}$ from a virtual machine VM2. The job type of the job request is determined (step 304). The job type might be determined from the various request attributes (e.g., an "attr[ ]" object of request attributes 186₂) of the job request. The determined job type is used to identify the location of a job request group that corresponds to the received incoming job request (step 306). Many techniques can be used to identify the location of a job request group in a queue. For example, metadata that keeps track of the locations of all job request groups can be consulted. Alternatively, the contents of the high priority job queue and the low priority job queue associated with the job type are scanned to identify a job request group that corresponds to the virtual machine that issued the job request. As an example, high priority job queue 152 and low priority job queue 154 might be scanned to identify a job request group associated with VM2.

If no job request group for the associated virtual machine exists in one of the queues (see "No" path of decision 308), then a new, empty job request group corresponding to the virtual machine is created at the tail of the high priority job queue (step 310). Regardless of whether a job request group has just been newly created, or if it has been determined that a job request group is already in existence for the virtual machine in one of the queues (see "Yes" path of decision 308), then the incoming job request is placed at the end of the located job request group (step 312). For example, and as shown, if no job request group is found for VM2, job request group $G_{VM2}$ is created and placed at the tail of the high priority job queue, and the job request $J_{VM2}$ is placed at the end position of job request group $G_{VM2}$. In the example case shown, the end position and the start position of job request group $G_{VM2}$ are the same position since the job request group is a newly-created job request group.

As another example of processing through the flow of FIG. 3, suppose an incoming job request for VM3 was received. And further suppose that an existing job request group $G_{VM3}$ (e.g., in either the high priority job queue 152 or low priority job queue 154) has an existing job request for VM3 already in that job request group $G_{VM3}$. Then in such a situation, the incoming job request for VM3 will be placed at the end of job request group $G_{VM3}$. In some cases, an existing job request group might be an empty job request group that remains from previous processing of the queues.

The foregoing discussions include techniques for processing a job request so that it is positioned in one of the multi-level queues in a condition ready to be considered for execution. Techniques for selecting a next job (e.g., to bring into the job executor) from the queues are disclosed in further detail as follows.

Figure 4A:
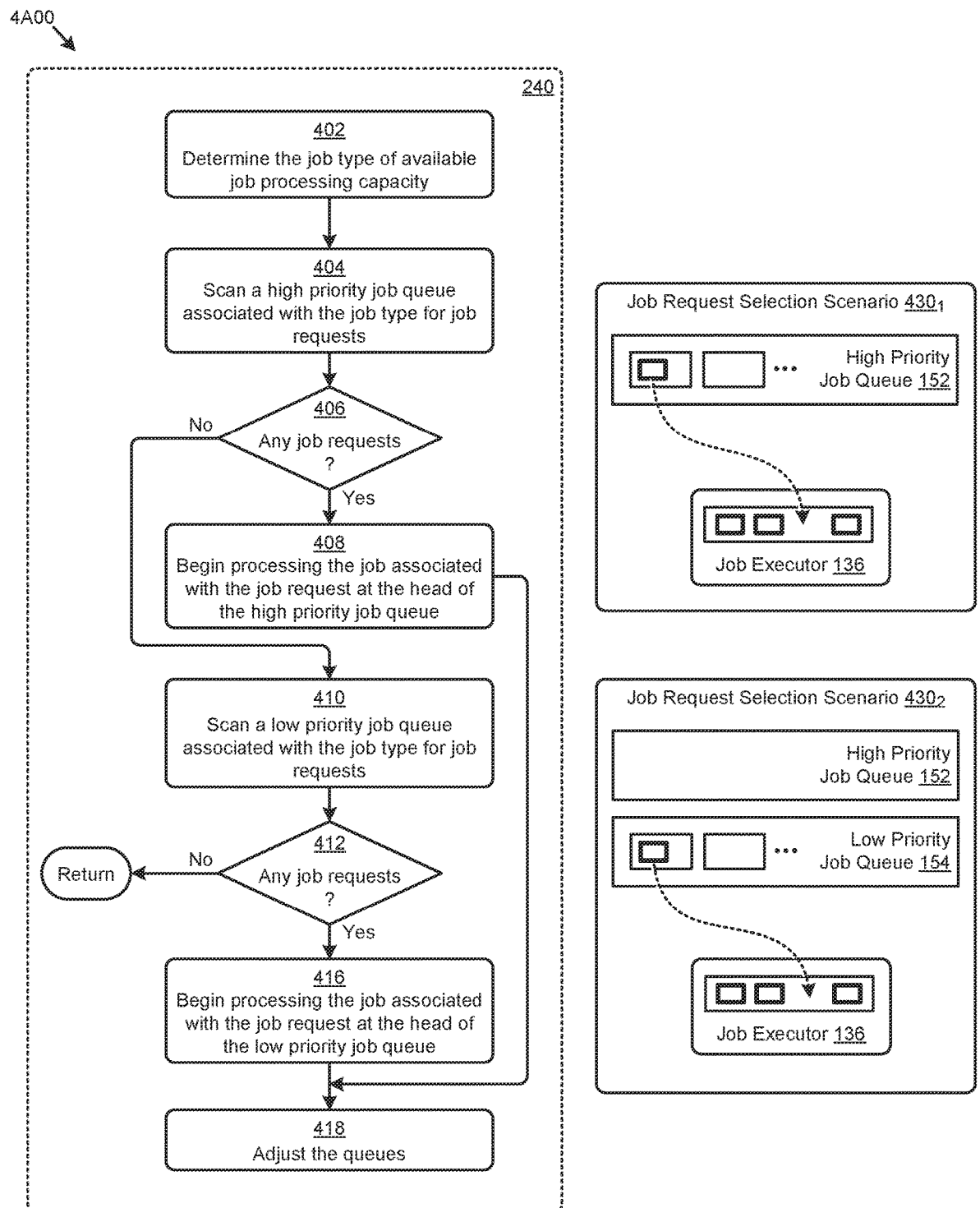
FIG. 4A presents a job request selection technique as used in systems that implement multi-level job queues for scheduling jobs in virtualization environments, according to an embodiment.

FIG. 4A presents a job request selection technique 4A00 as used in systems that implement multi-level job queues for scheduling jobs in virtualization environments. As an option, one or more variations of job request selection technique 4A00 or any aspect thereof may be implemented in the context of the architecture and functionality of the embodiments described herein. The job request selection technique 4A00 or any aspect thereof may be implemented in any environment.

FIG. 4A illustrates one aspect pertaining to actively positioning job requests over two or more job queues having respective prioritization levels to facilitate a balanced processing order of jobs invoked by virtualized entities in a virtualization environment. Specifically, the figure is presented to illustrate one embodiment of certain steps and/or operations for selecting a job request from multi-level queues for processing. Certain scenarios are also shown in the figure to illustrate example applications of the job request selection technique 4A00.

The job request selection technique 4A00 can commence by determining the job type of available job processing capacity (step 402). For example, a job type might correspond to storage I/O capacity or to network I/O capacity, or to CPU cycle processing capacity, etc. Such available job processing capacity might be become available upon initialization of certain computing resources (e.g., at node installation) or upon completion of one or more in-process jobs. The job type will indicate the set of multi-level queues that are associated with the available job processing capacity. As such, a high priority job queue (e.g., from the multi-level job queues) associated with the job type is scanned for job requests (step 404). If one or more job requests are discovered (see "Yes" path of decision 406), the job request at the head of the high priority job queue is selected for processing (step 408). As illustrated in job request selection scenario $430_1$, a job request at the head of high priority job queue 152 is selected for processing by job executor 136. Following selection of the job request, the contents of the job queues are adjusted (step 418).

If no job requests are in the high priority job queue (see "No" path of decision 406), a low priority job queue associated with the job type is scanned for job requests (step 410). If one or more job requests are discovered (see "Yes" path of decision 412), the job request at the head of the low priority job queue is selected for processing (step 416) and the contents of the job queues are adjusted (step 418). The job request selection scenario $430_2$ indicates the high priority job queue 152 contains no job requests, so that a job request at the head of low priority job queue 154 is selected by job executor 136. If no job requests are in the low priority job queue (see "No" path of decision 412), then no job requests are present in any of the multi-level queues to fill the available job processing capacity. In this case, the flow returns to the caller. The caller then waits until a job scheduling event is detected.

As regards step 418, since a job has been moved from a queue to an executor, either resulting from operation of step 408 or resulting from operation of step 416, the queues can be adjusted accordingly. One possible technique for such adjustment is shown and described as pertains to FIG. 4B.

Figure 4B:
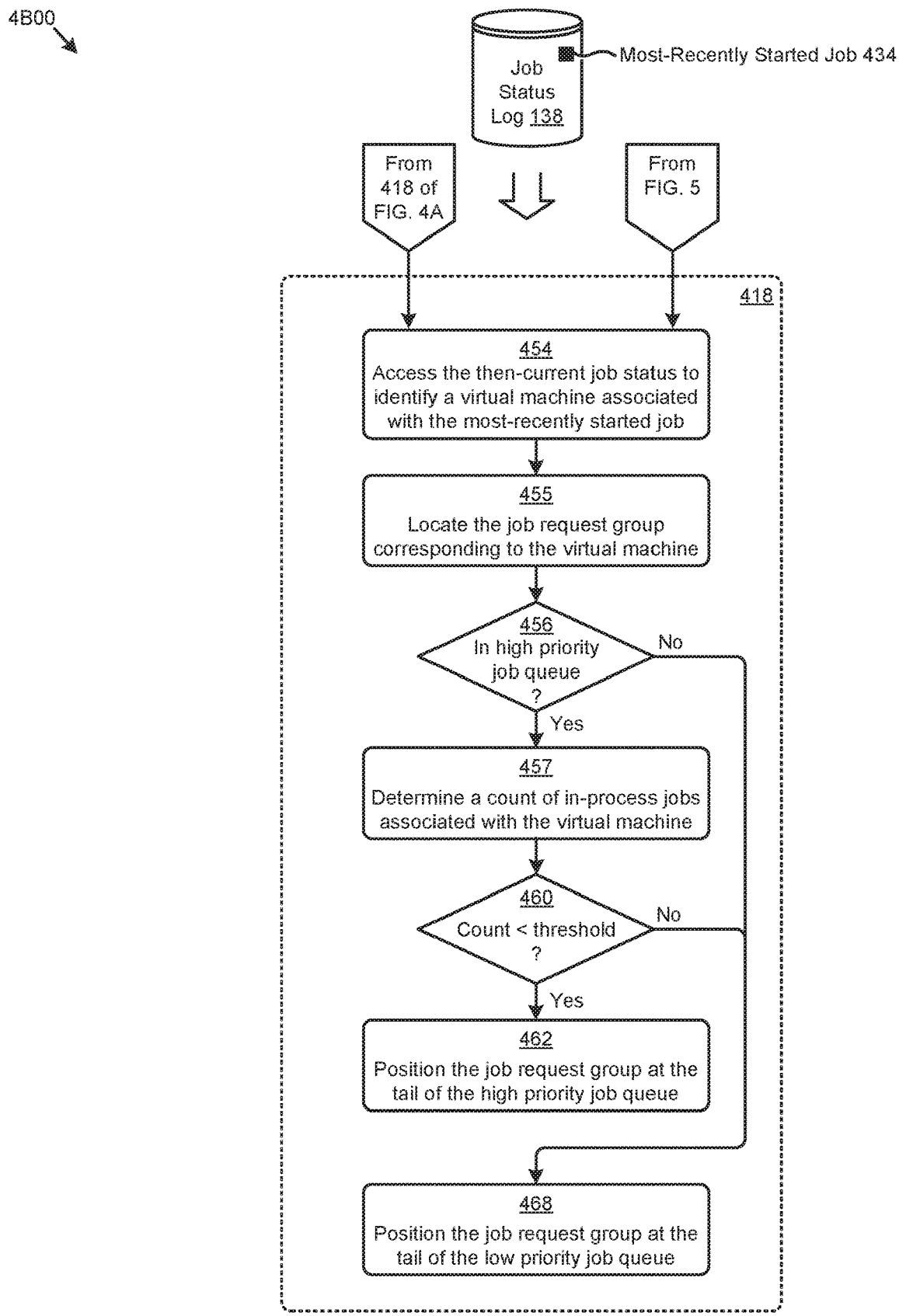
FIG. 4B presents a multi-level queue management technique as used in systems that implement multi-level job queues for scheduling jobs in virtualization environments, according to an embodiment.

FIG. 4B presents a multi-level queue management technique 4B00 as used in systems that implement multi-level job queues for scheduling jobs in virtualization environments, according to an embodiment.

As shown, the multi-level queue management technique 4B00 accesses the then-current job status log 138 to identify a virtual machine associated with the most-recently started job (step 454). In this embodiment, the most-recently started job is the job that was started as a result of operation of step 408 or as a result of operation of step 416. In some alternative embodiments, accesses to the job status log 138 might be performed at some scheduled cadence to identify the most-recently started job (e.g., the shown most-recently started job 434).

The job request group corresponding to the virtual machine is then located (step 455). If the job request group is in the high priority job queue (see "Yes" path of decision 456), then a count of the in-process jobs associated with the virtual machine is determined (step 457). If the count is less than an in-process jobs threshold (see "Yes" path of decision 460), then the job request group is positioned at the tail of the high priority job queue (step 462). When the count of in-process jobs for the virtual machine is less than the in-process jobs threshold (e.g., a threshold maximum of two jobs), the job request group for the virtual machine can remain in the high priority job queue. On the other hand, if the job request group for the virtual machine is not in the high priority job queue (see "No" path of decision 456) or the count of in-process jobs for the virtual machine is not less than the in-process jobs threshold (see "No" path of decision 460), then the job request group is positioned at the tail of the low priority job queue (step 468).

The foregoing discussions include techniques for managing (e.g., reorganizing) various multi-level queues. Additional techniques are disclosed in further detail as follows.

Figure 5:
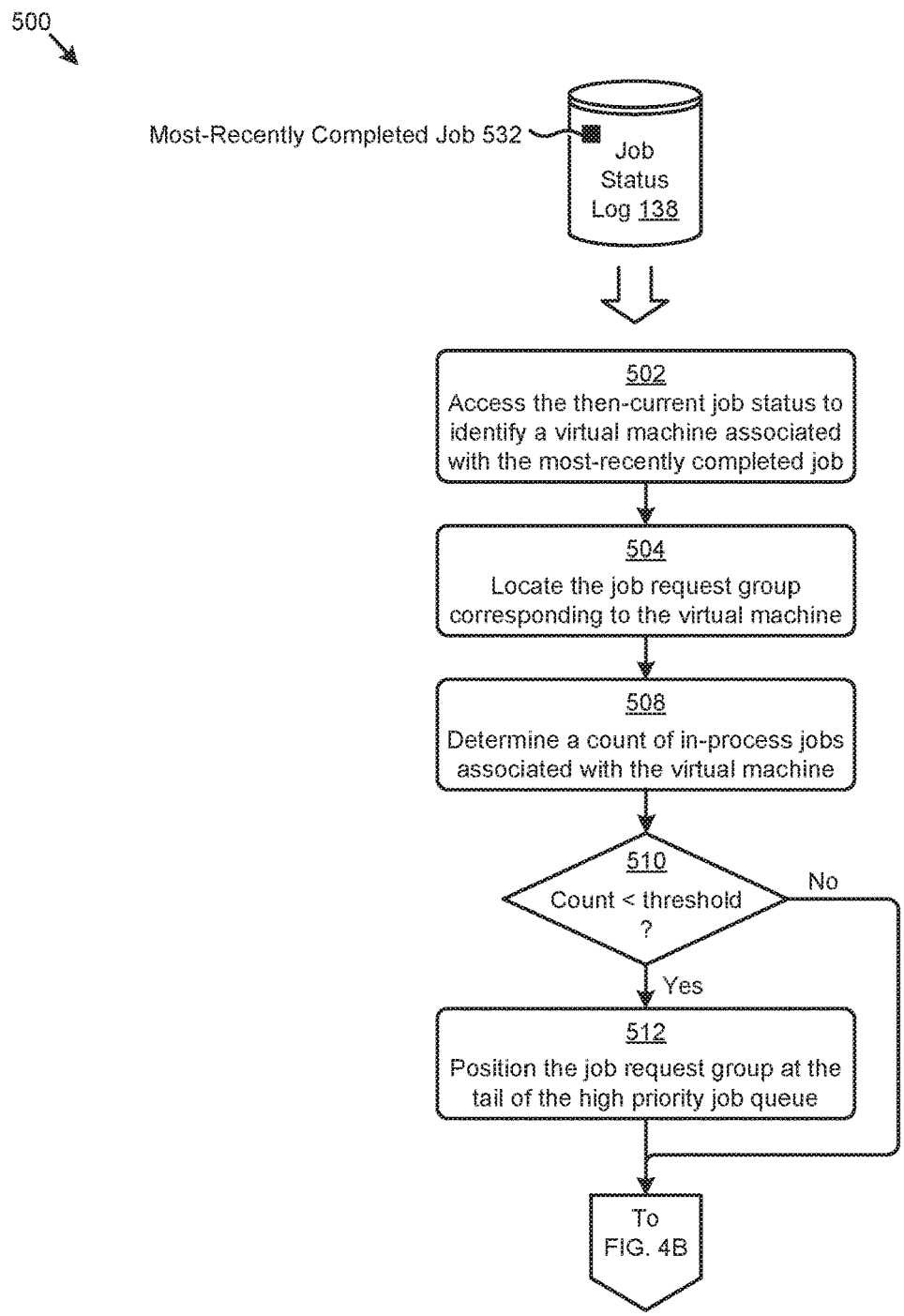
FIG. 5 presents a multi-level queue management technique as used in systems that implement multi-level job queues for scheduling jobs in virtualization environments, according to an embodiment.

FIG. 5 presents a multi-level queue management technique 500 as used in systems that implement multi-level job queues for scheduling jobs in virtualization environments. As an option, one or more variations of multi-level queue management technique 500 or any aspect thereof may be implemented in the context of the architecture and functionality of the embodiments described herein. The multi-level queue management technique 500 or any aspect thereof may be implemented in any environment.

FIG. 5 illustrates one aspect pertaining to actively positioning job requests over two or more job queues having respective prioritization levels to facilitate a balanced processing order of jobs invoked by virtualized entities in a virtualization environment. Specifically, the figure is presented to illustrate one embodiment of certain steps and/or operations for managing (e.g., reorganizing) various multi-level queues implemented according to the herein disclosed techniques for scheduling jobs in virtualization environments.

At some point in job processing, for example when a job finishes, it might be appropriate to promote a job request group. Such a promotion operation might apply when a job request group of the job that had just finished is in the low priority queue. If the just finished job changed the state of the job executor such that the VM that had previously been demoted to the low priority queue no longer has more than a threshold number of in-process jobs in the job executor, then it can be promoted to the high priority queue. FIG. 5 depicts a technique to perform such promotion.

Specifically, the shown multi-level queue management technique 500 commences by accessing the then-current job status to identify a virtual machine associated with a most-recently completed job (step 502). As illustrated, certain data records in job status log 138 can be accessed to identify a most-recently completed job 532. Furthermore, such data records can associate the most-recently completed job 532 to the virtual machine that issued the job request for the job. In some cases, the job status log 138 might be accessed according to the multi-level queue management technique 500 at some scheduled cadence to identify the most-recently completed job. In other cases, job status log 138 might be accessed in response to some event, such as a job completion event (e.g., as signaled by a job executor).

The job request group corresponding to the virtual machine is then located (step 504). Then, a count of the in-process jobs associated with the virtual machine is determined (step 508). For example, a query of the job status log 138 can be performed to determine the count of the jobs associated with the virtual machine that have an "in-process" status. If the count is less than an in-process jobs threshold (see "Yes" path of decision 510), then the job request group is positioned at the tail of the high priority job queue (step 512). That is, since the count of in-process jobs for the virtual machine is below the in-process jobs threshold (e.g., a maximum of two jobs), the job request group for the virtual machine either remains in the high-priority queue or is promoted from the low priority job queue to the high priority job queue. If the job request group for the virtual machine was already in the high priority job queue, or if the count of in-process jobs for the virtual machine is not less than the in-process jobs threshold (see "No" path of decision 510), then no change to the position of the job request group associated with the virtual machine is performed.

A set of scenarios that depict certain job request queuing operations performed in accordance with the herein disclosed techniques are disclosed as follows.

Figure 6A:
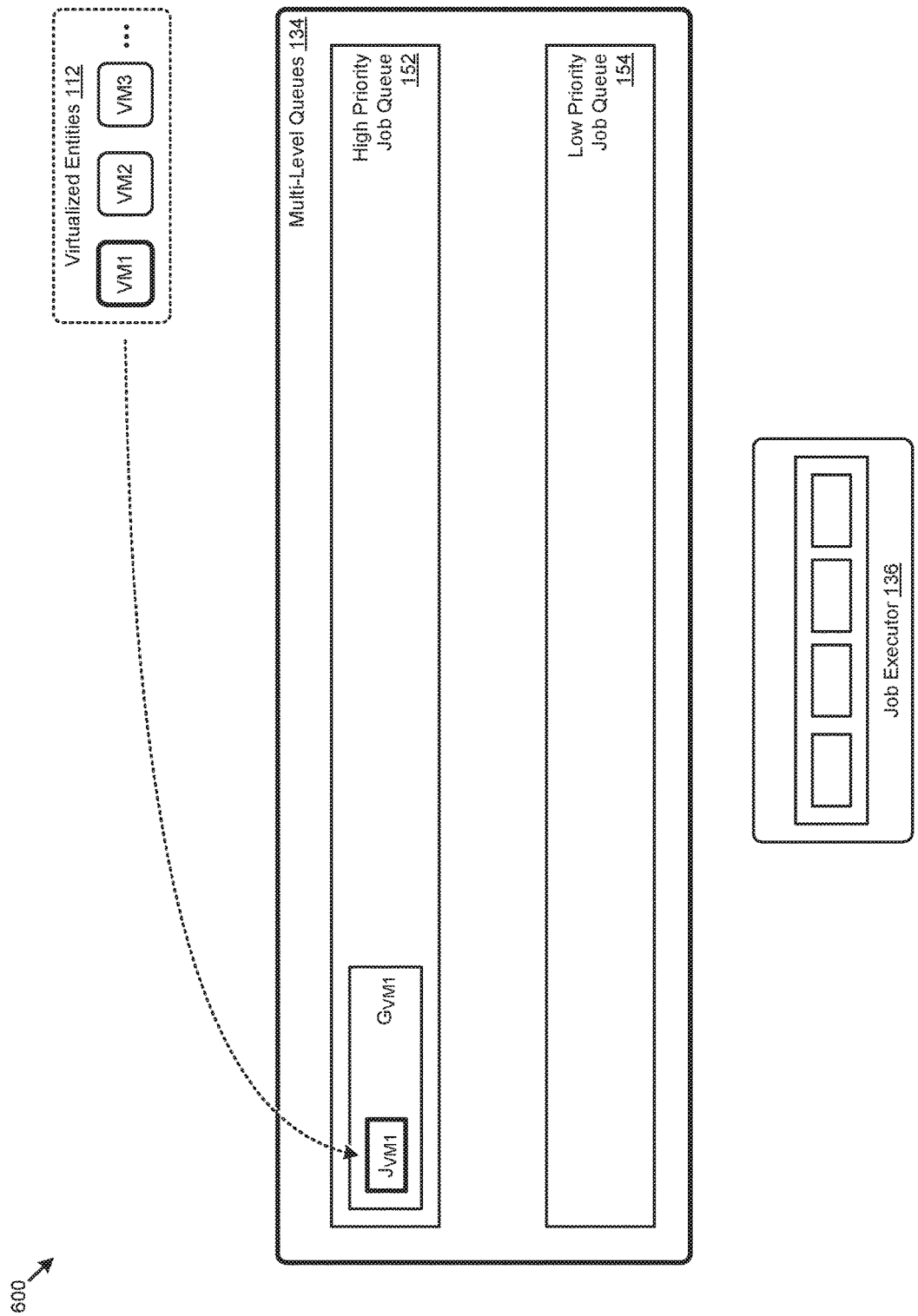
FIG. 6A through FIG. 6T depict job request queuing scenarios as used in systems that implement multi-level job queues for scheduling jobs in virtualization environments, according to an embodiment.
Figure 6B:
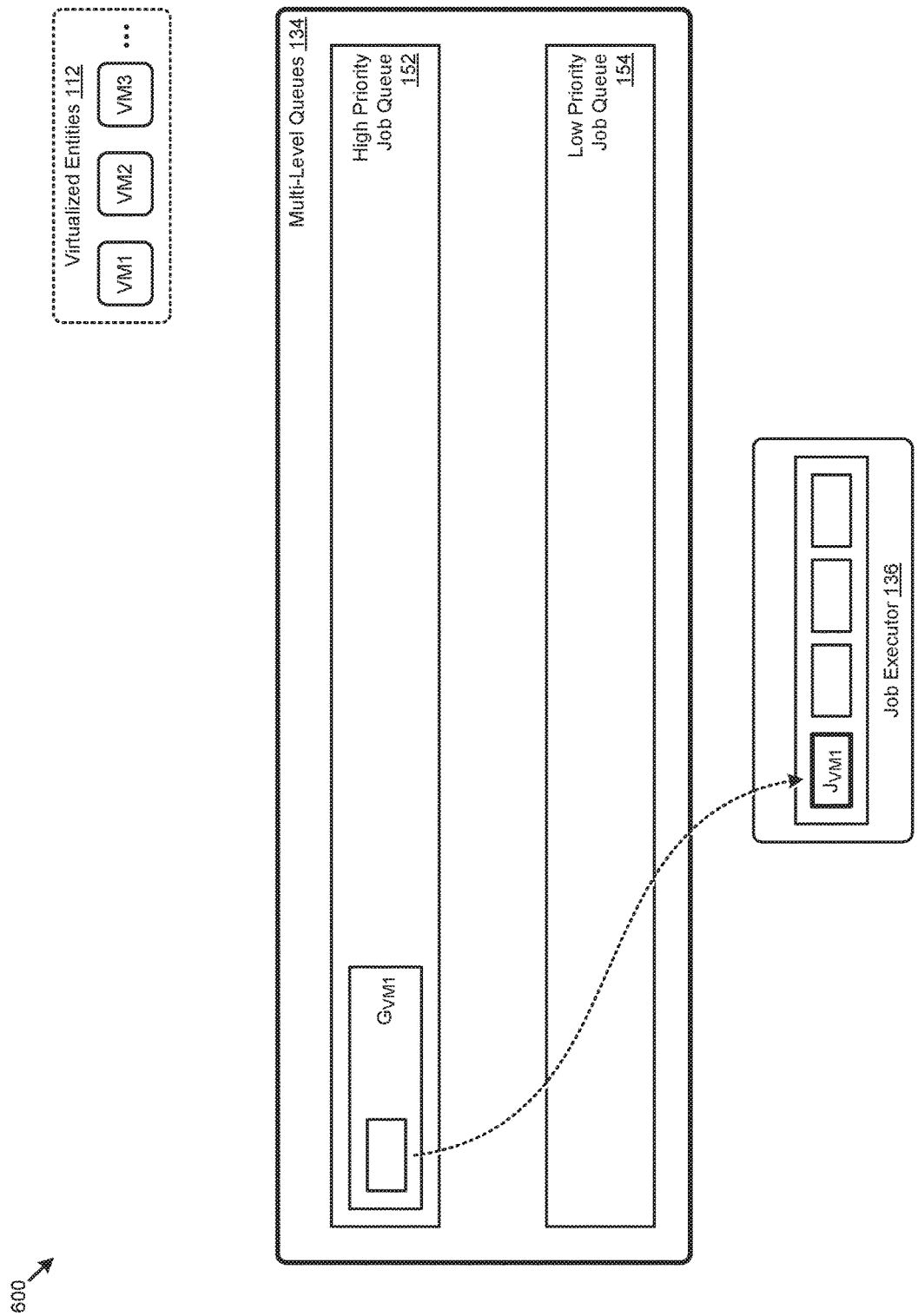
Figure 6C:
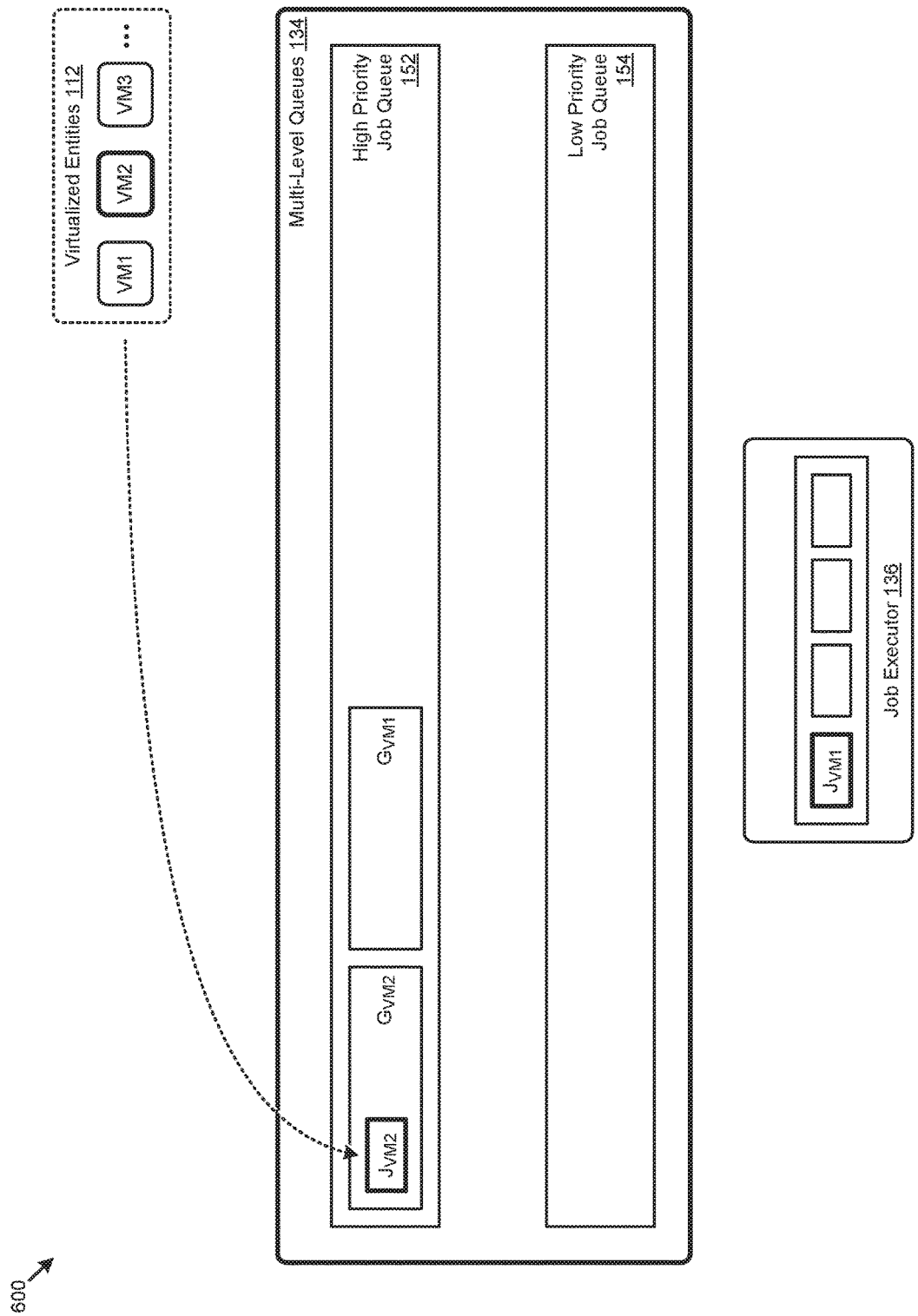
Figure 6D:
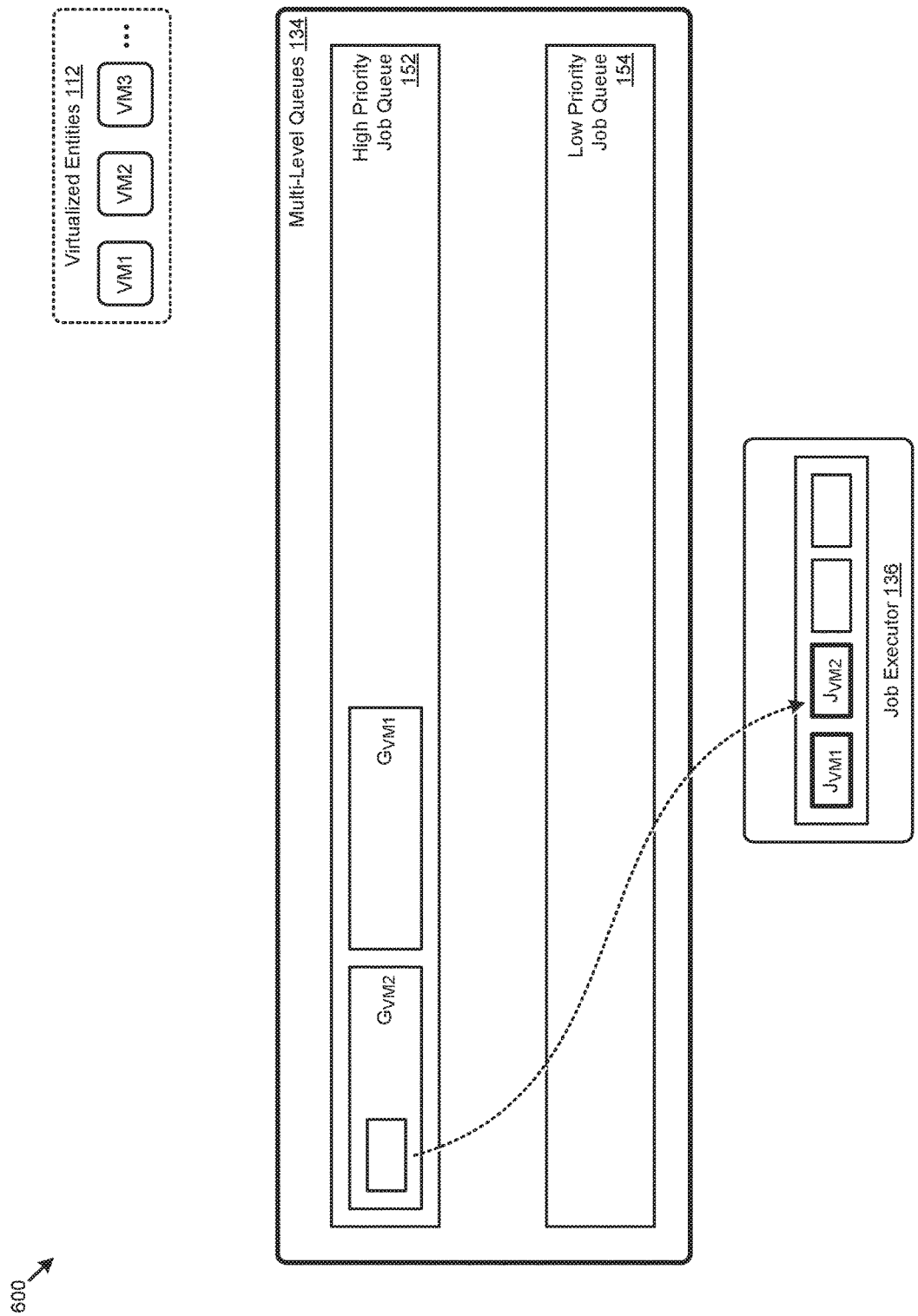
Figure 6E:
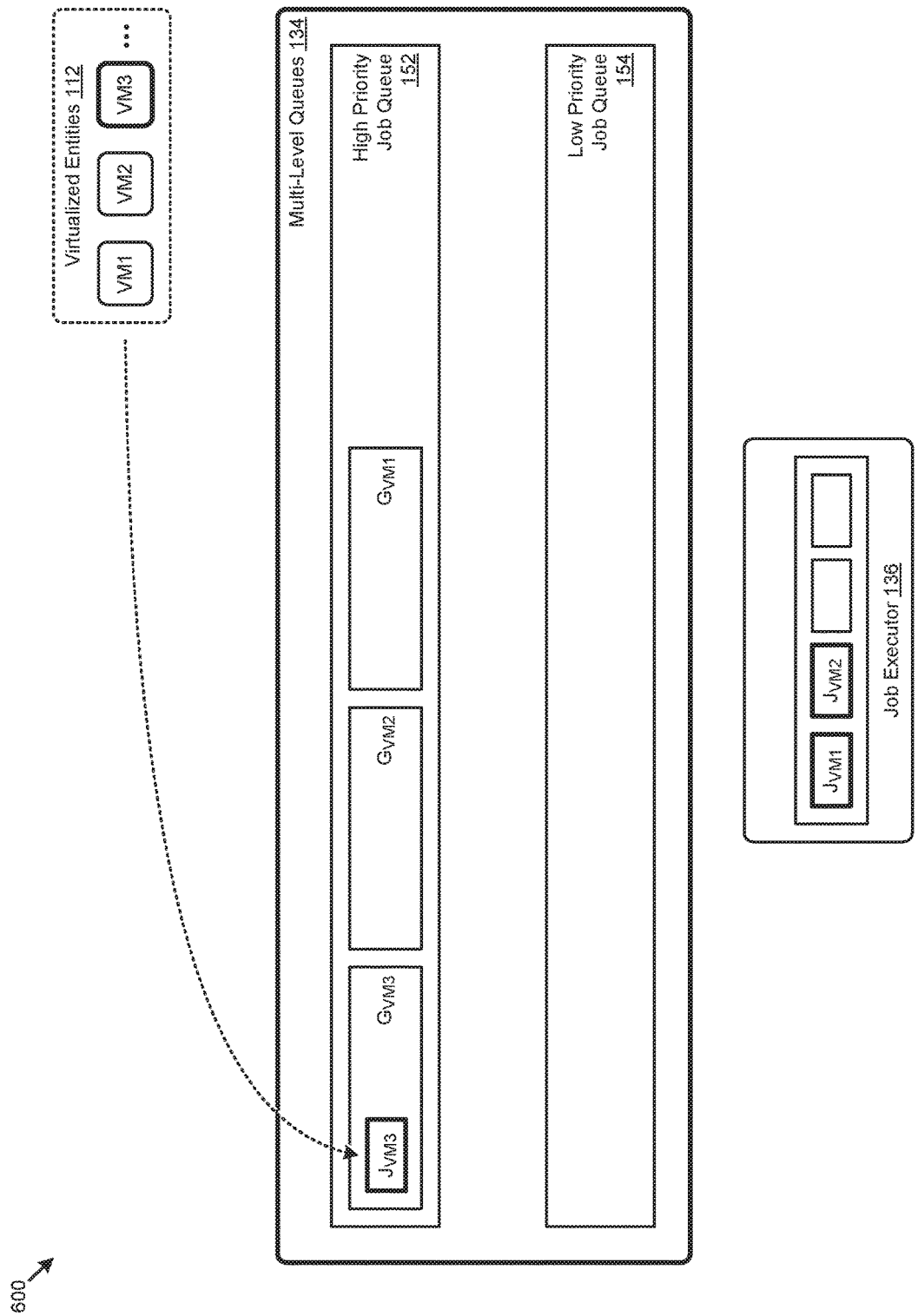
Figure 6F:
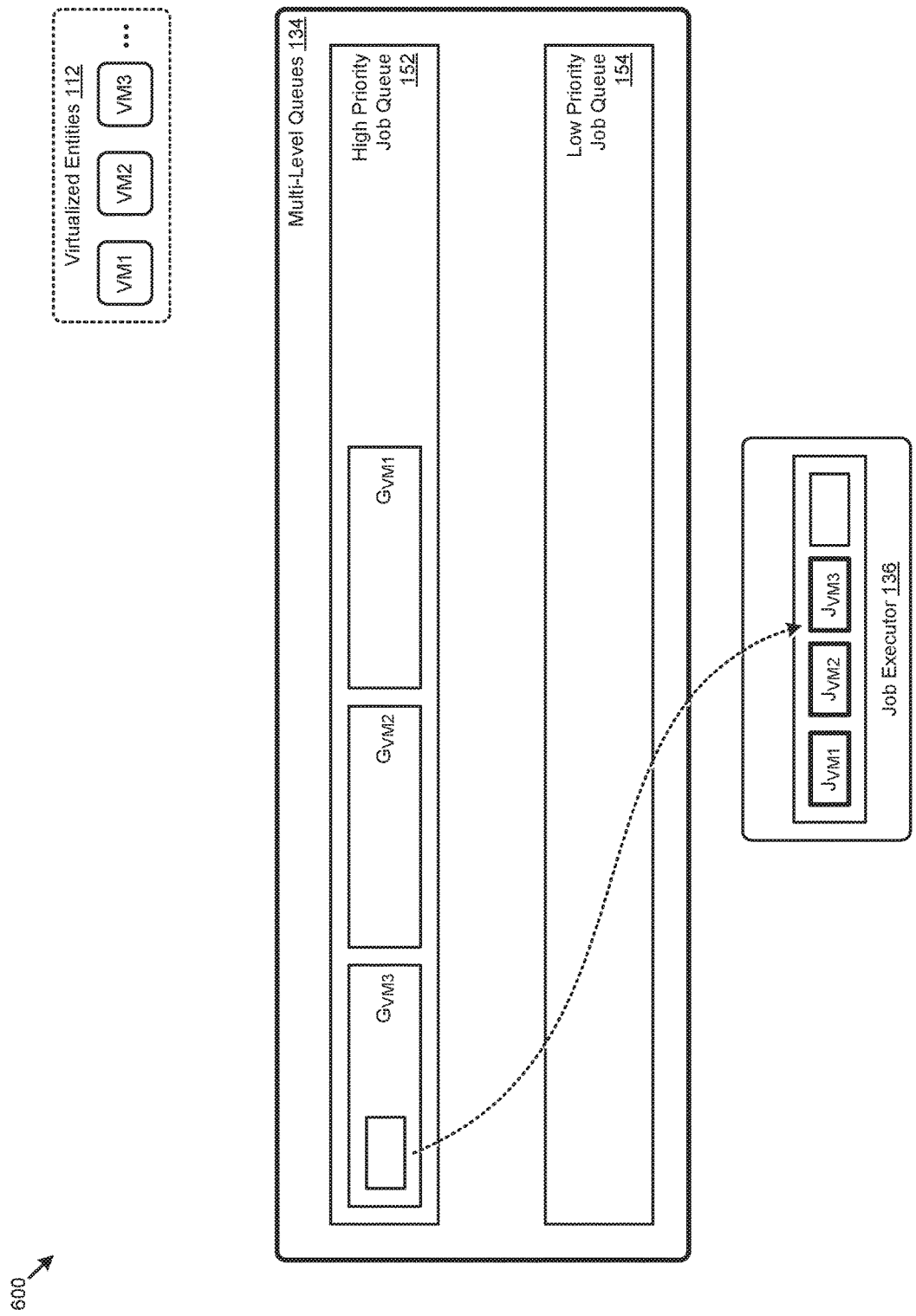
Figure 6G:
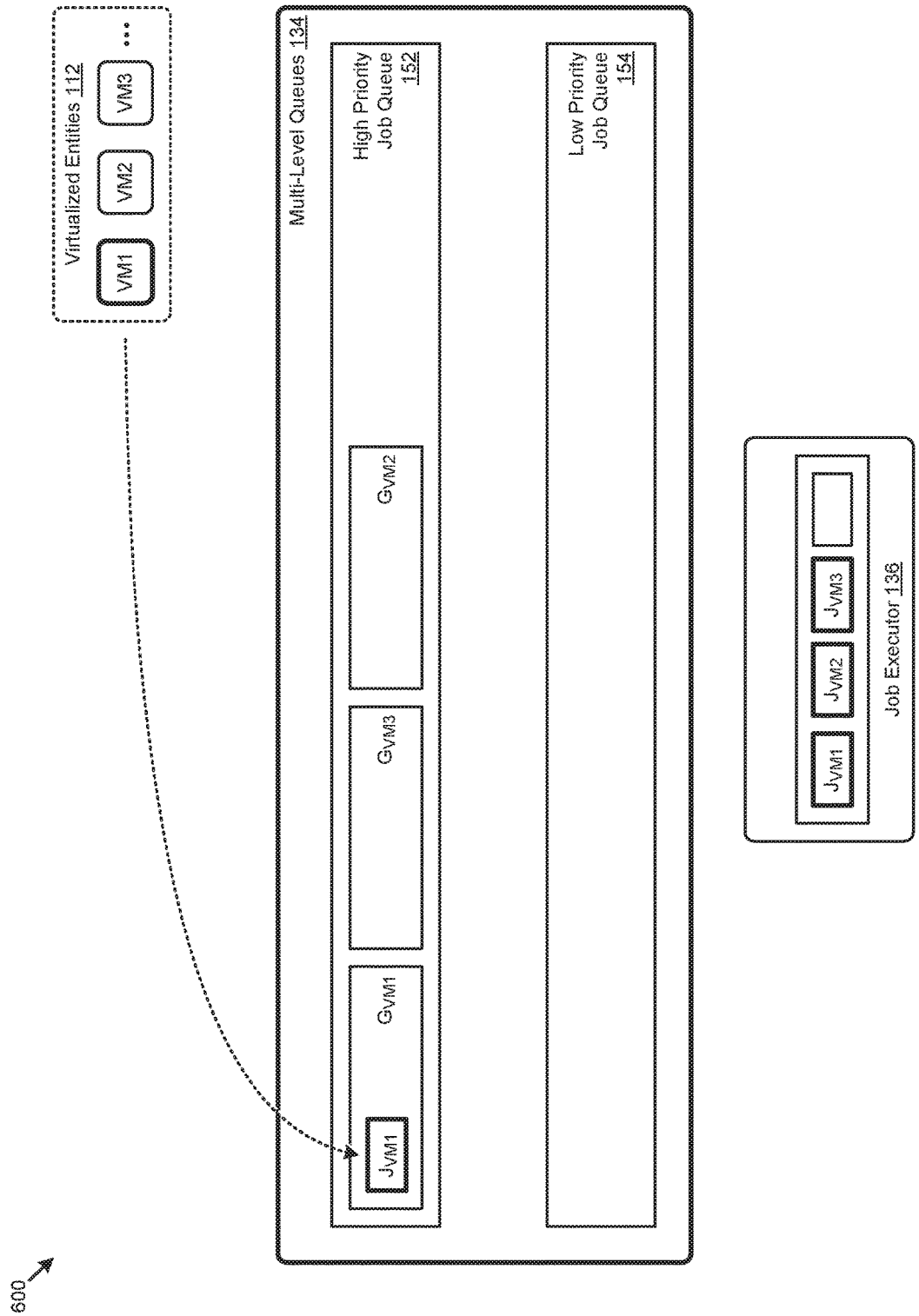
Figure 6H:
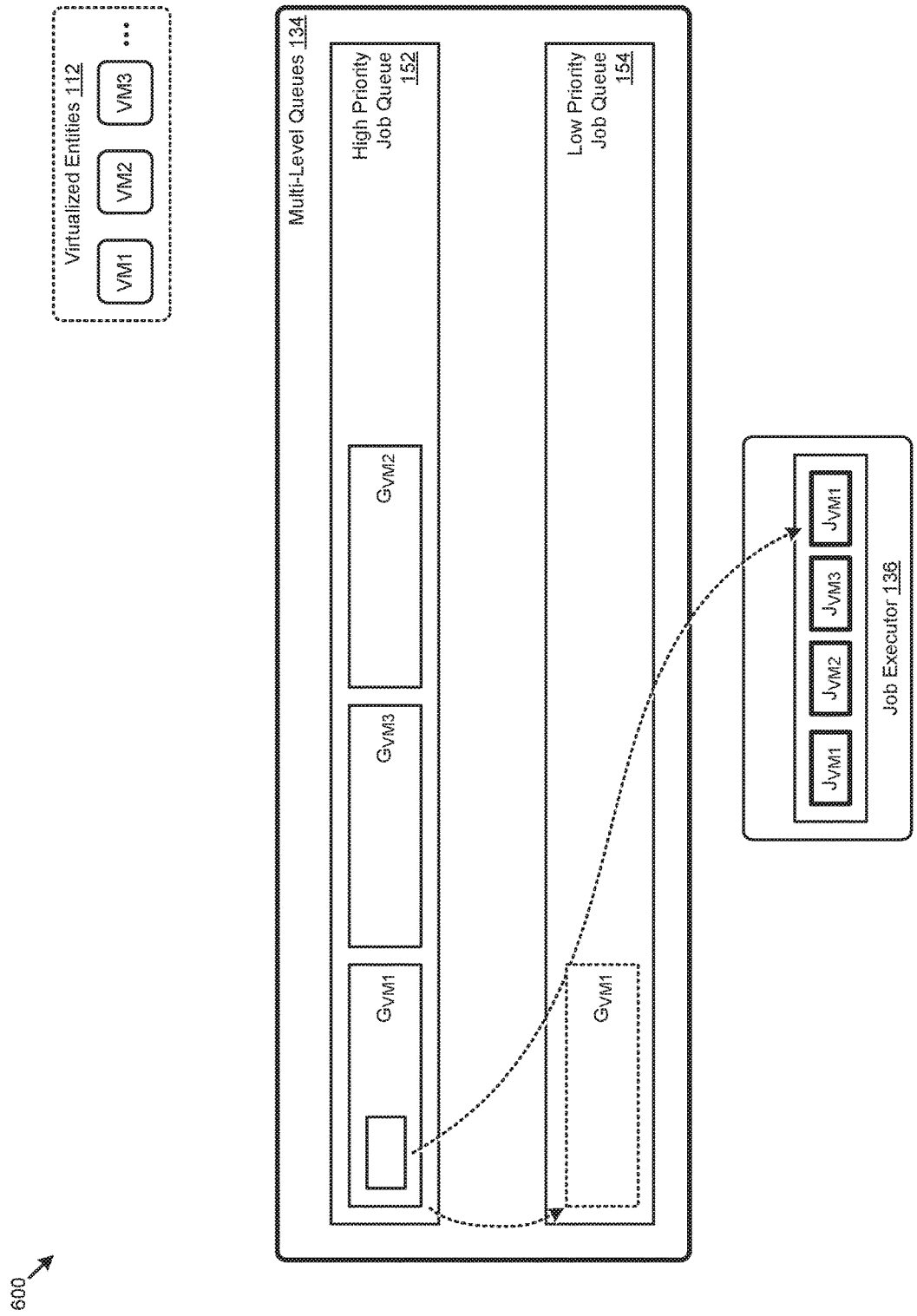
Figure 6I:
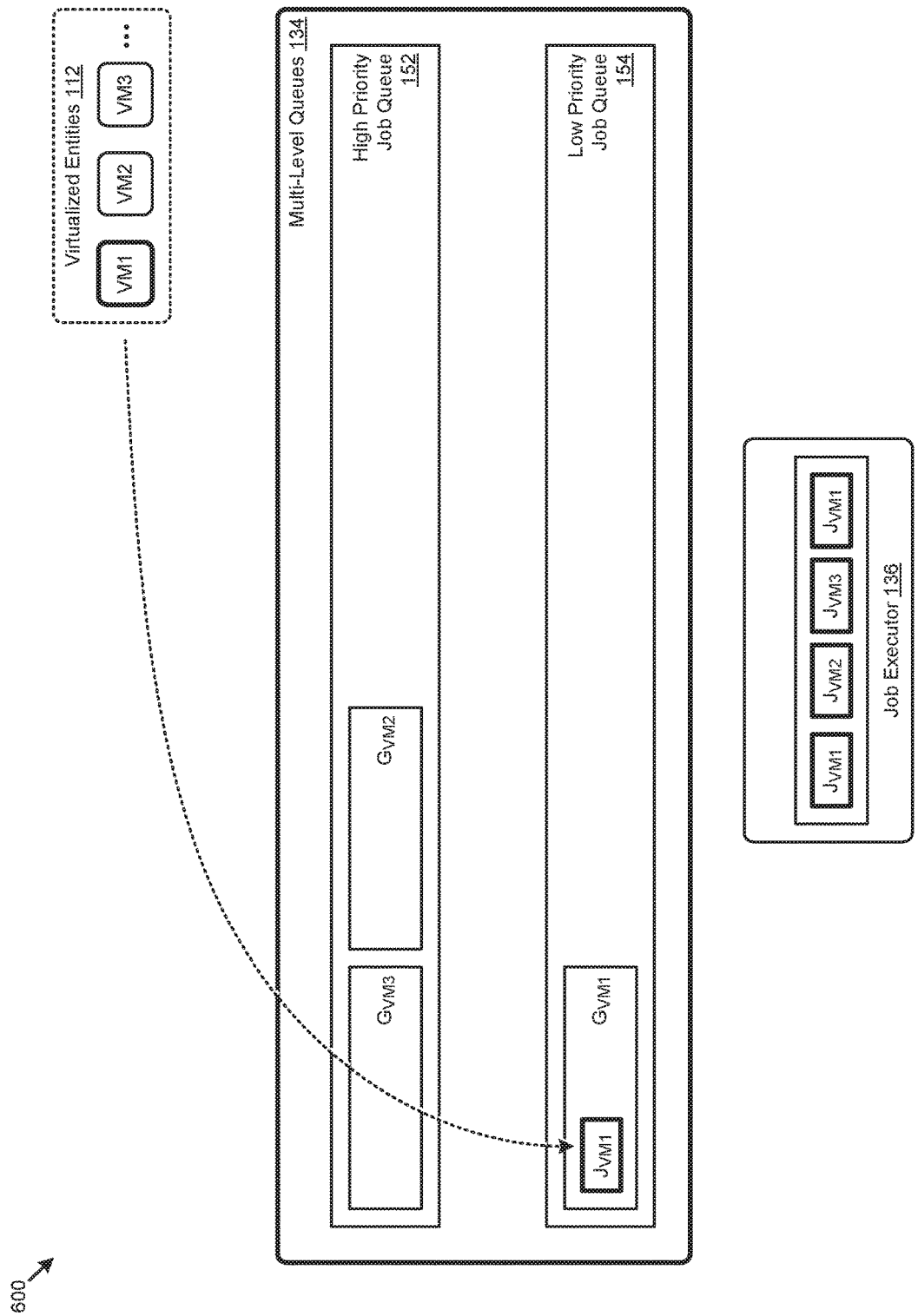
Figure 6J:
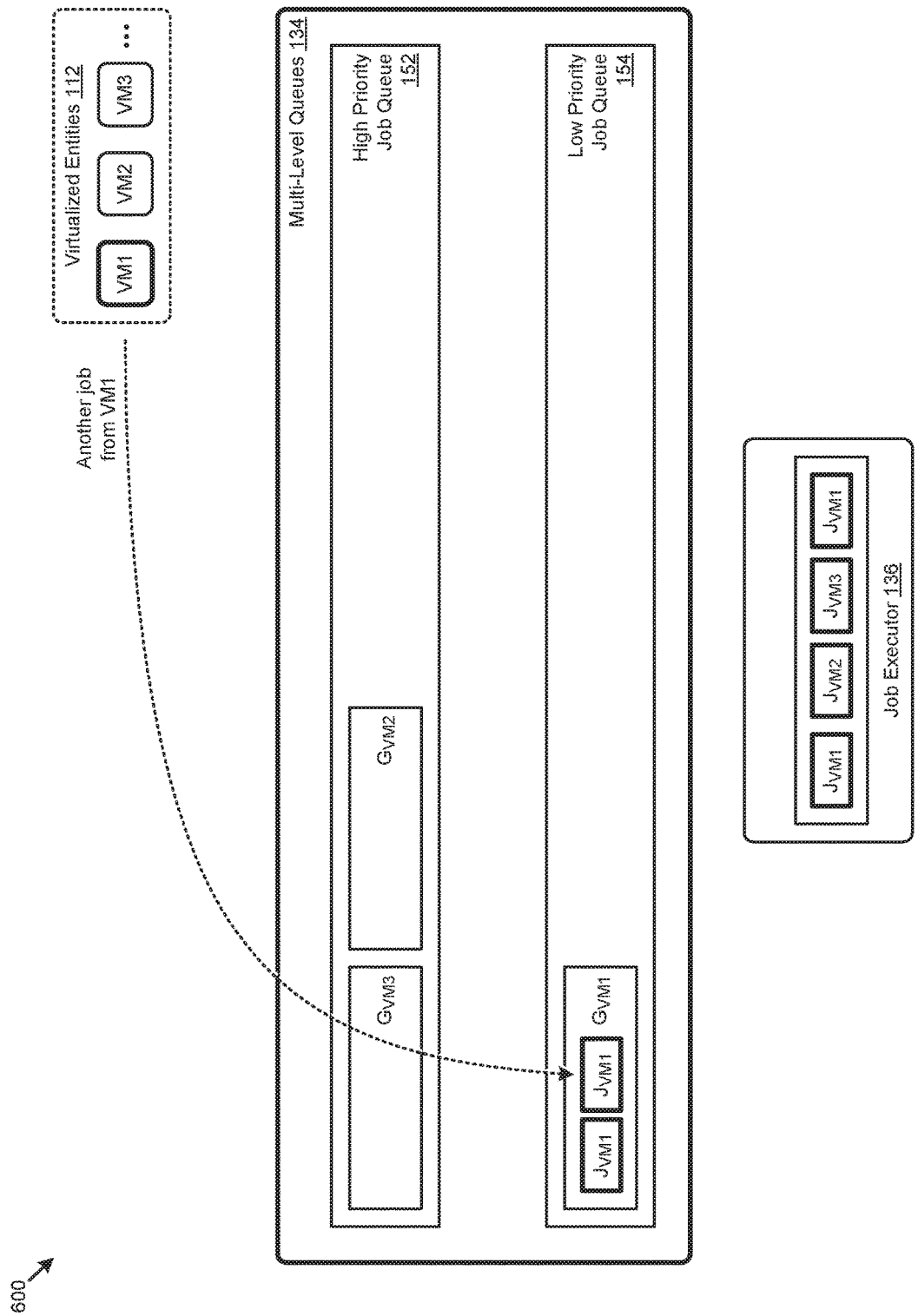
Figure 6K:
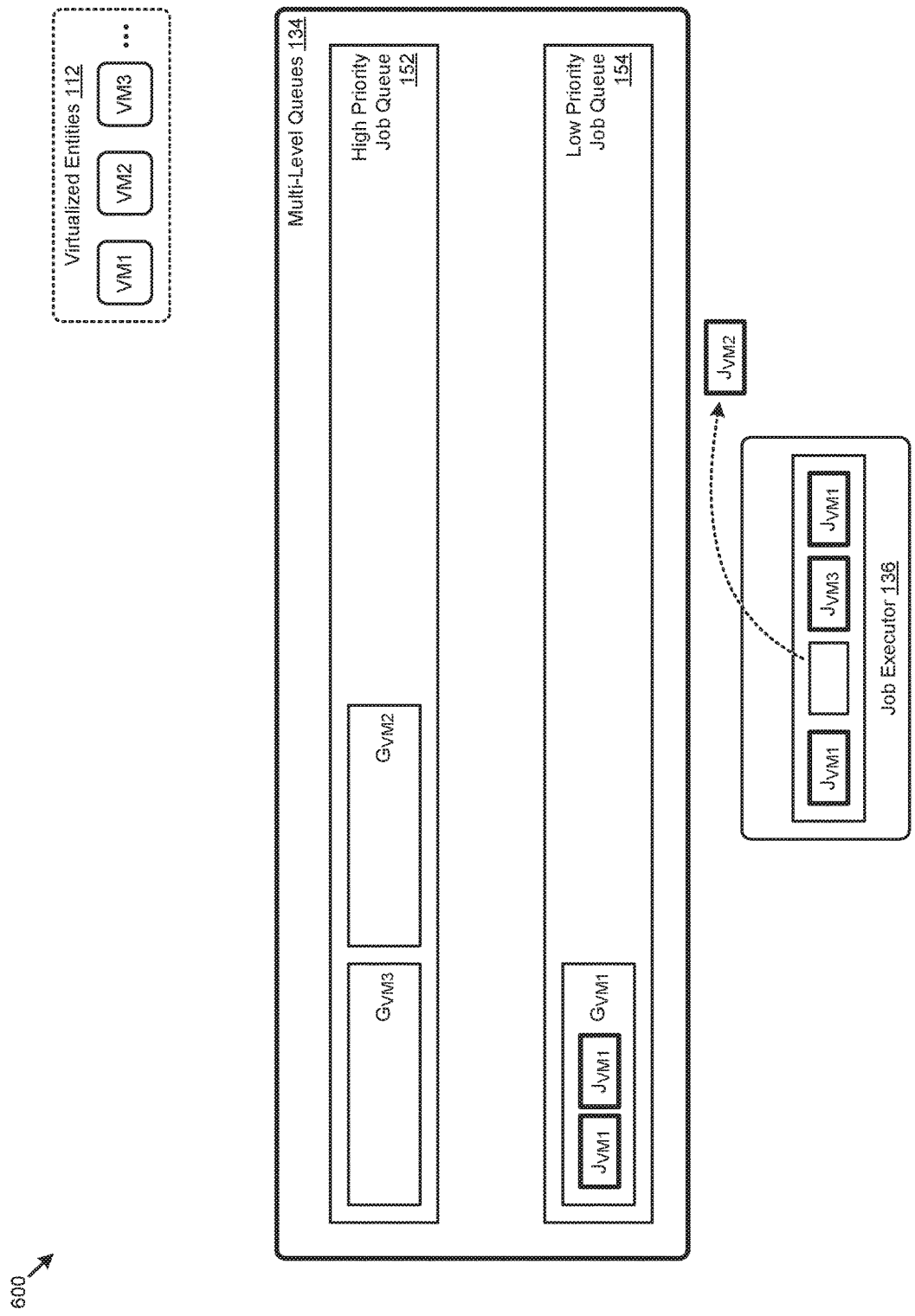
Figure 6L:
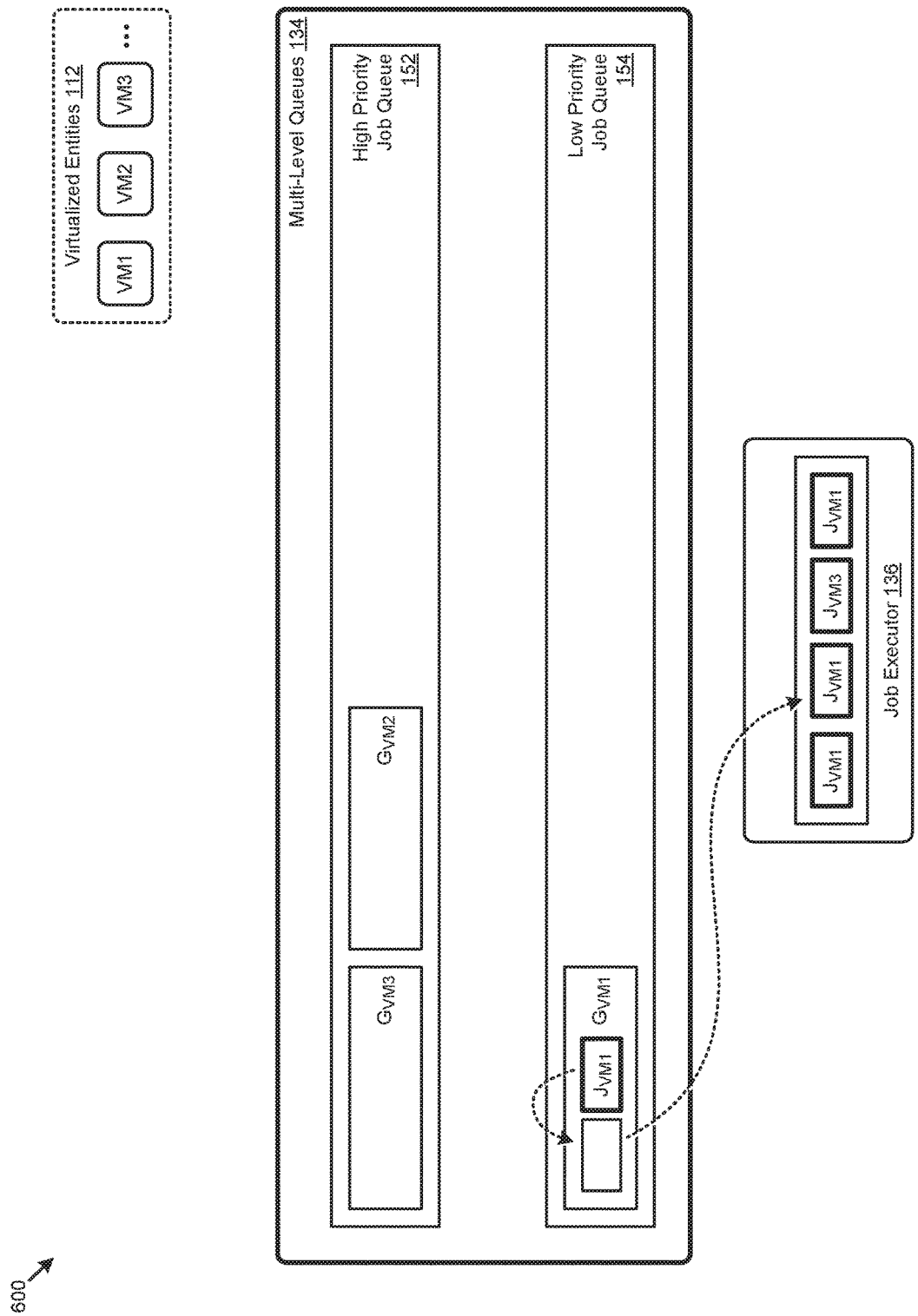
Figure 6M:
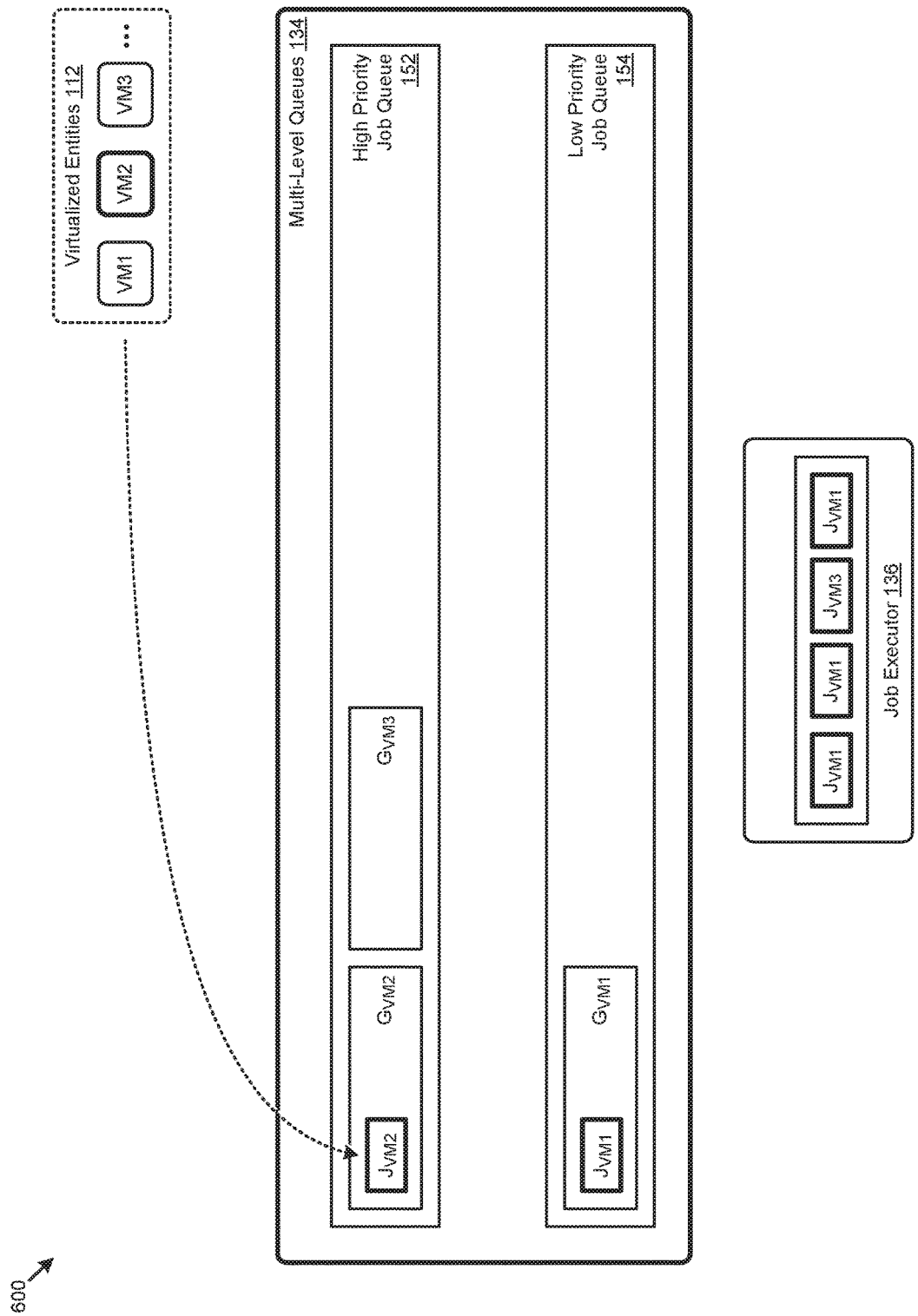
Figure 6N:
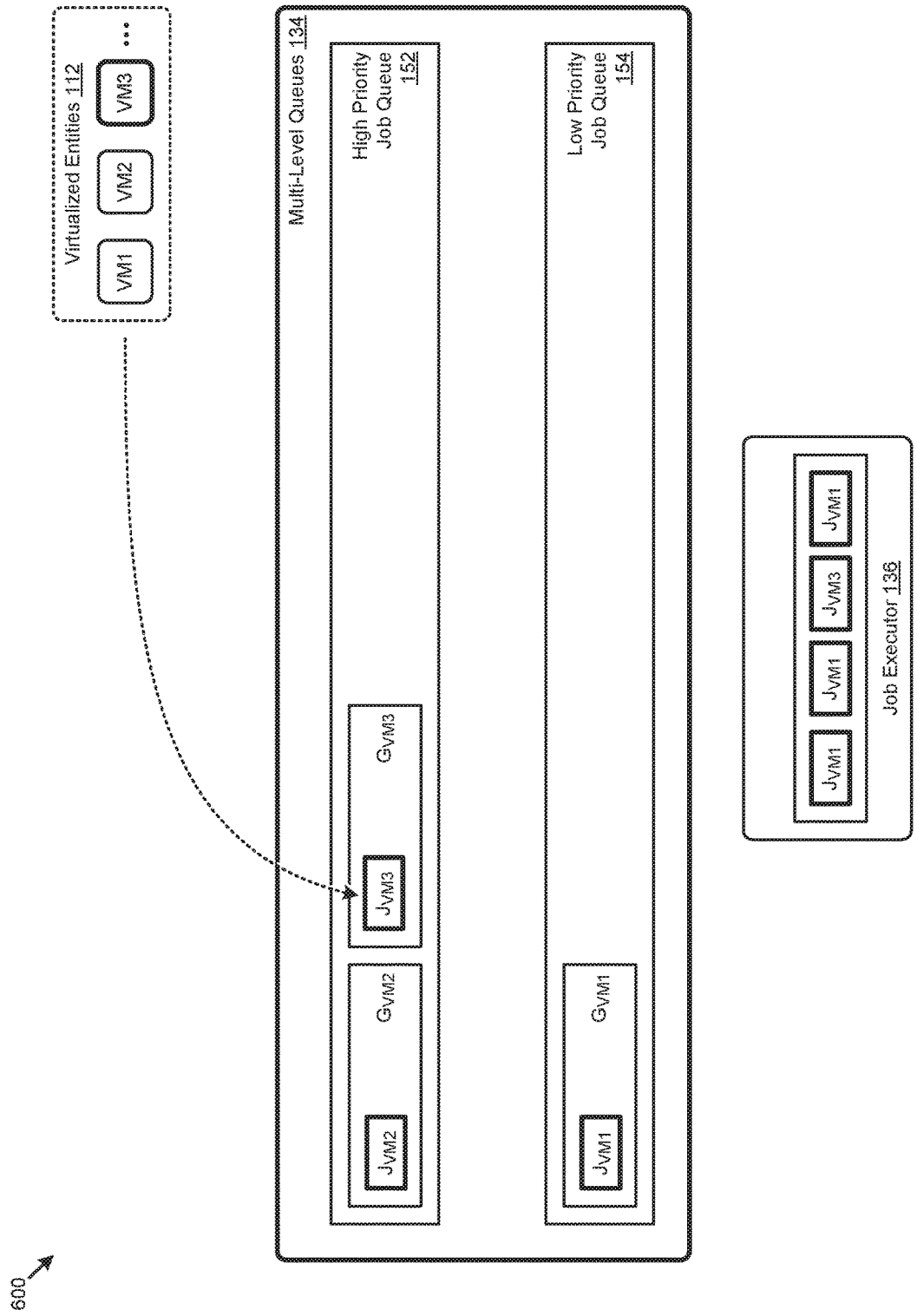
Figure 6C:
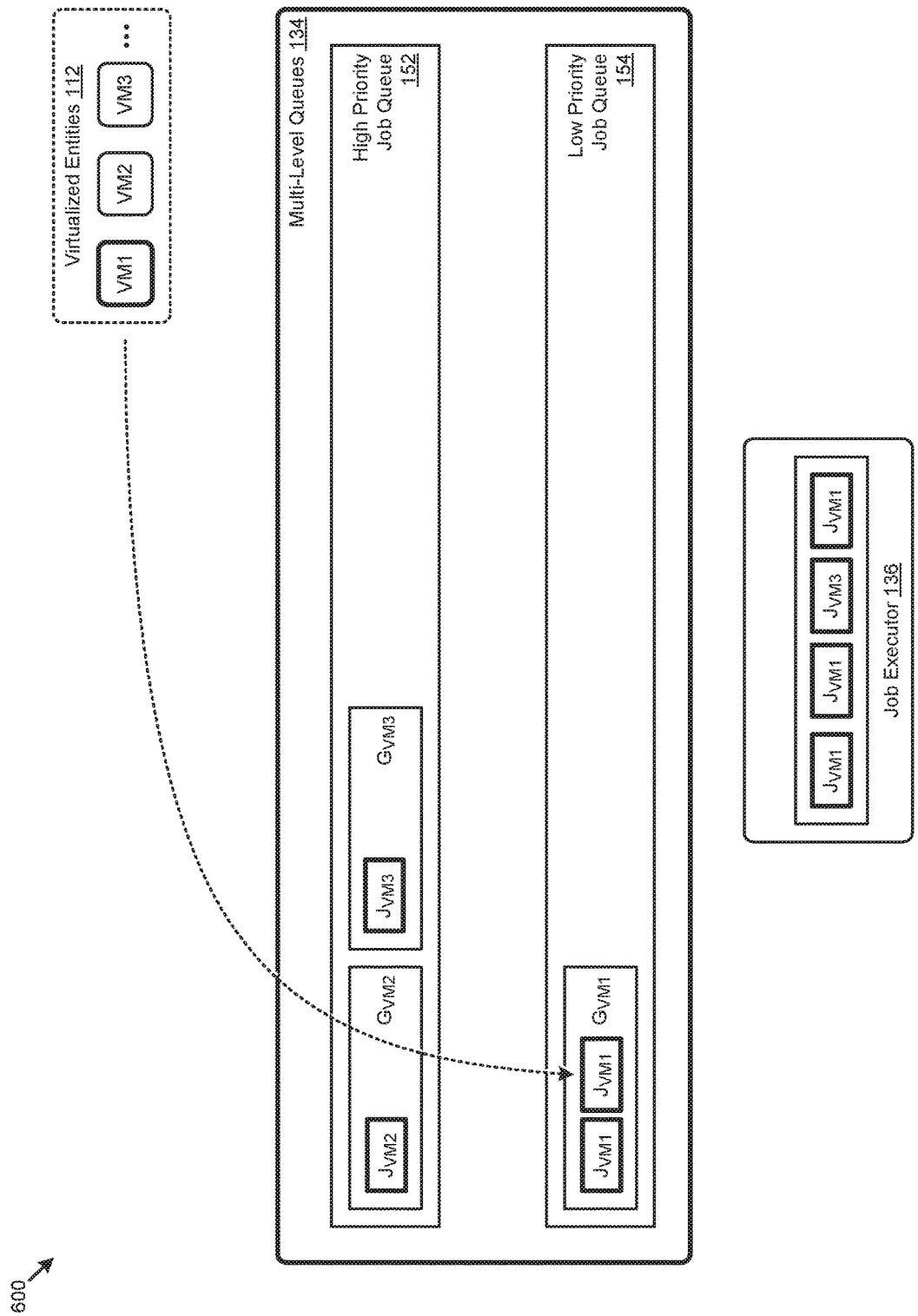
Figure 6P:
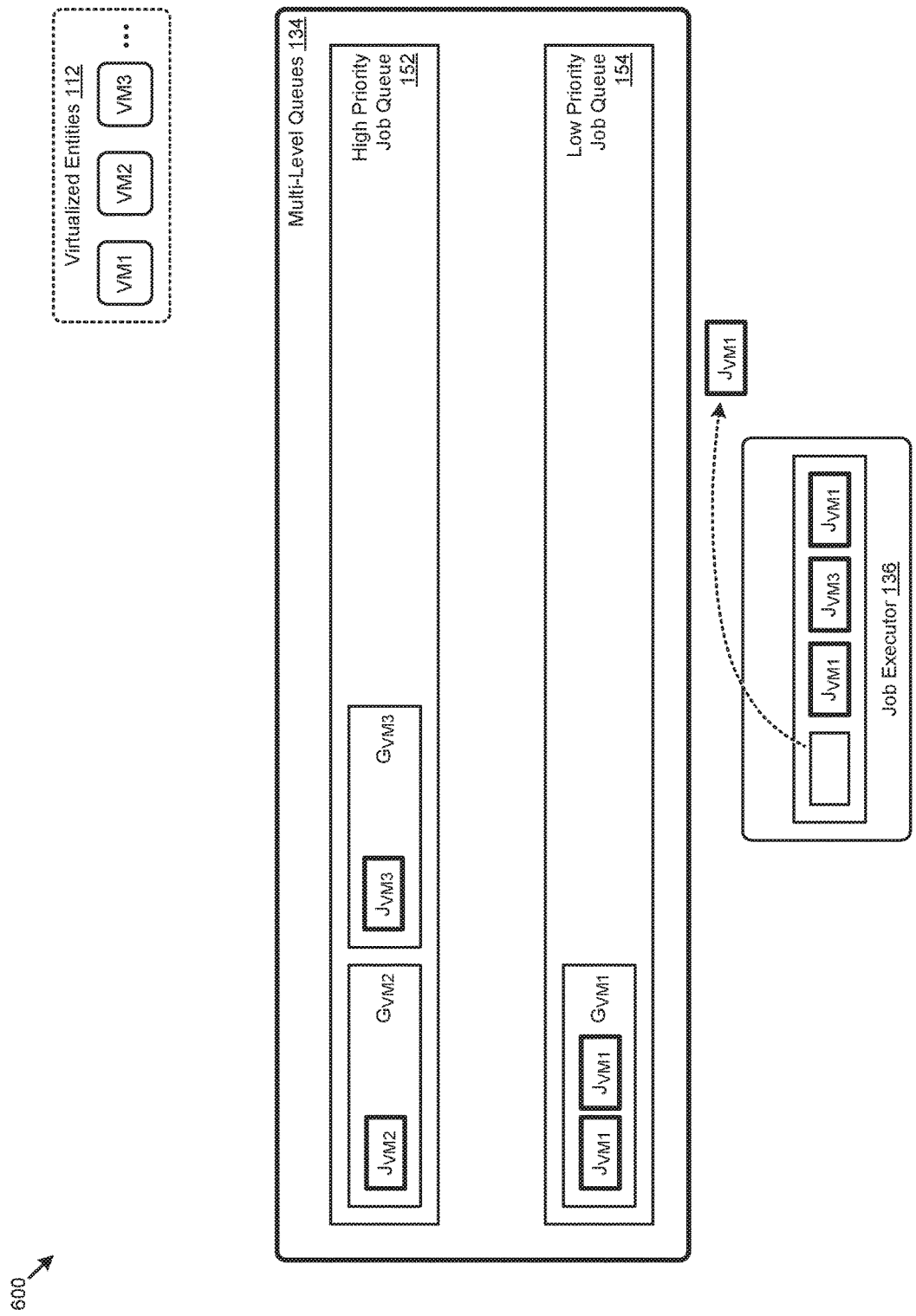
Figure 6Q:
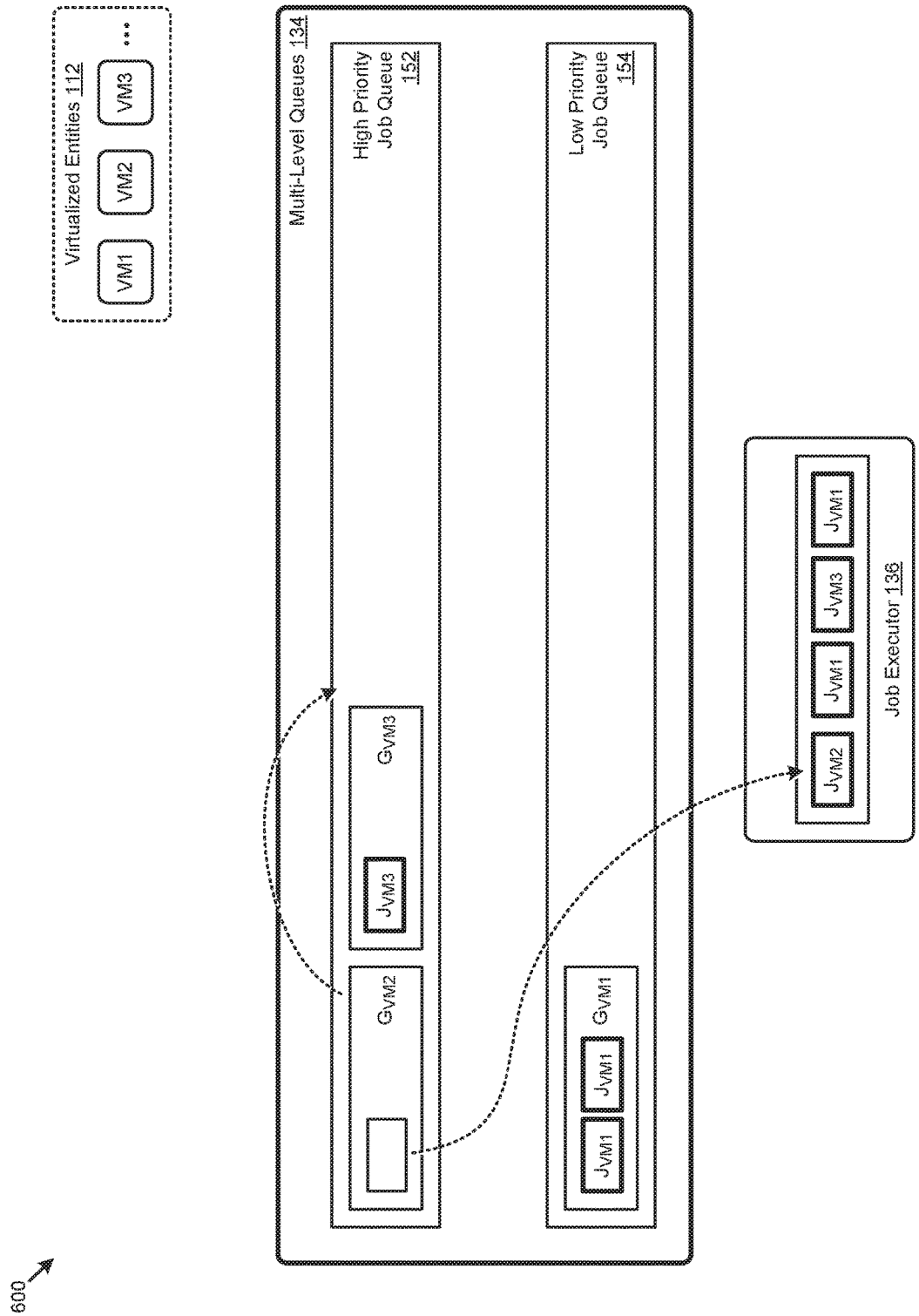
Figure 6R:
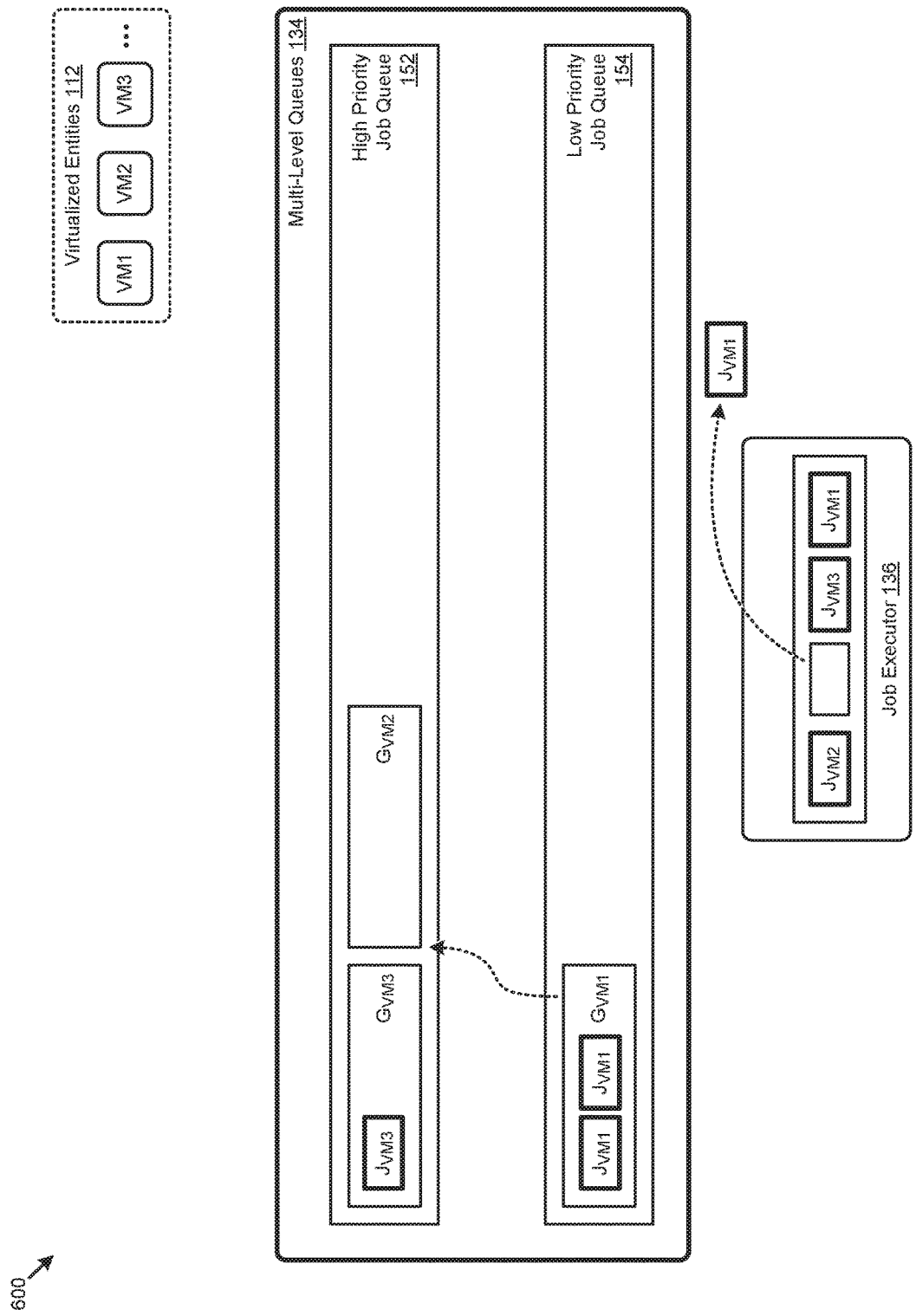
Figure 6S:
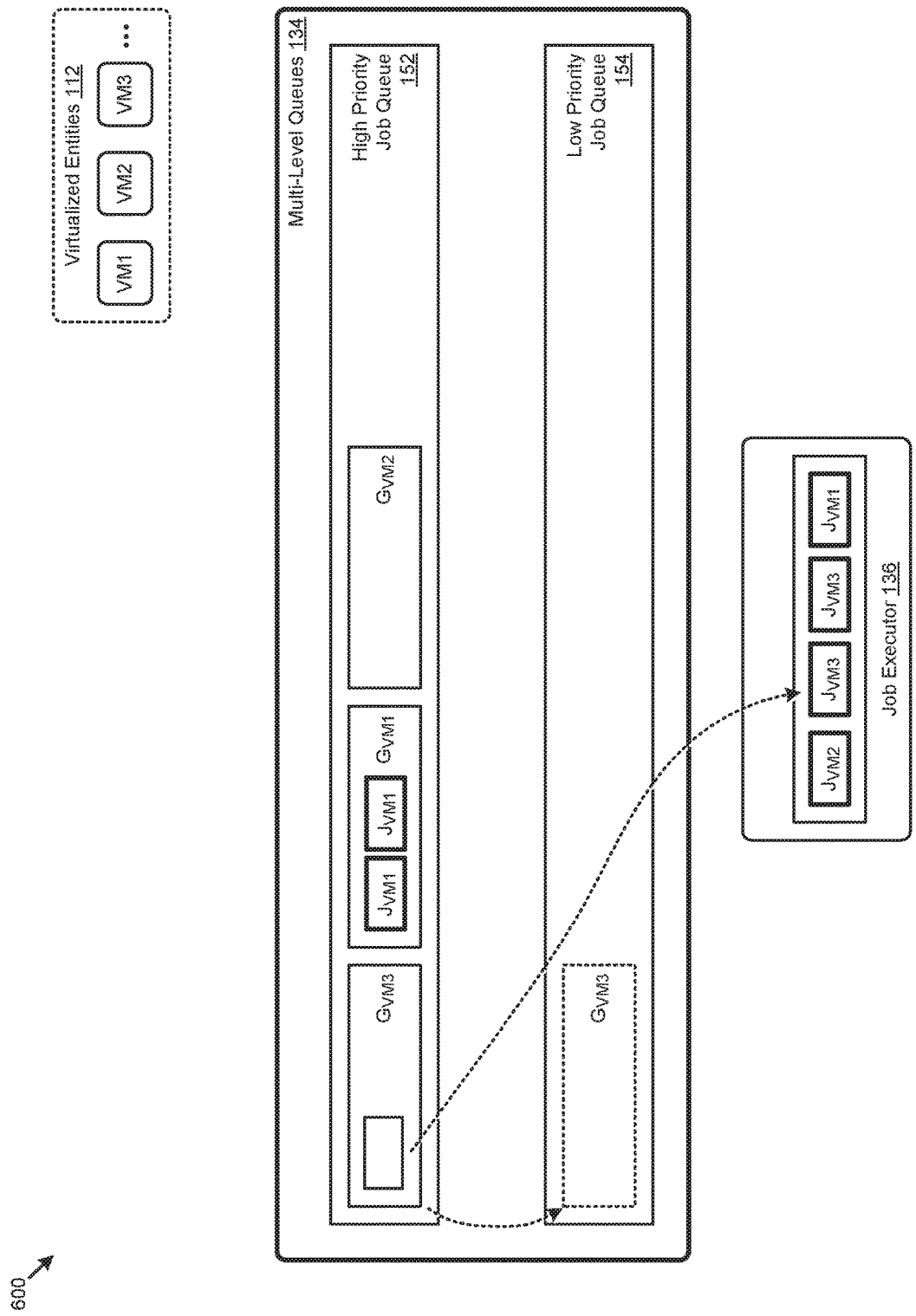
Figure 6T:
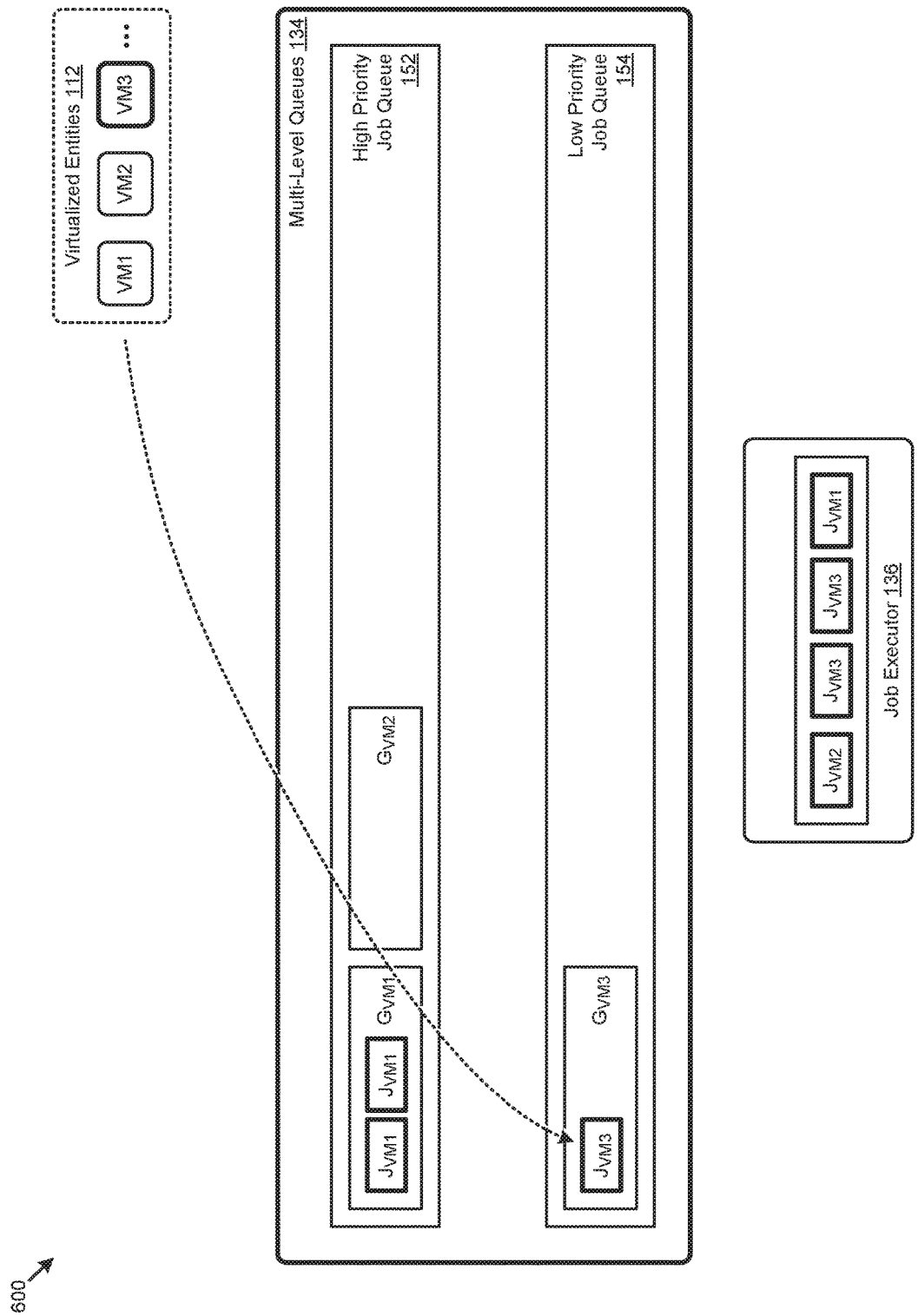

FIG. 6A through FIG. 6T depict a set of job request queuing scenarios 600 as used in systems that implement multi-level job queues for scheduling jobs in virtualization environments. As an option, one or more variations of job request queuing scenarios 600 or any aspect thereof may be implemented in the context of the architecture and functionality of the embodiments described herein. The job request queuing scenarios 600 or any aspect thereof may be implemented in any environment.

FIG. 6A through FIG. 6T illustrate one aspect pertaining to actively positioning job requests over two or more job queues having respective prioritization levels to facilitate a balanced processing order of jobs invoked by virtualized entities in a virtualization environment. Specifically, the figures are being presented to illustrate various operations performed in accordance with the herein disclosed techniques over the high priority job queue 152 and low priority job queue 154 of a set of multi-level queues 134 to facilitate a balanced processing order of job requests from a set of virtualized entities 112 to be executed at job executor 136. As shown at job executor 136, there are four slots of job processing capacity available in job request queuing scenarios 600. Furthermore, an in-process jobs threshold of two is applied in job request queuing scenarios 600.

As shown in FIG. 6A, the job request queuing scenarios 600 commence with a job request $J_{VM1}$ being received from VM1. A job request group $G_{VM1}$ is created for VM1 and positioned at the tail (e.g., equivalent to the head of an empty queue) of high priority job queue 152. The job request $J_{VM1}$ is then positioned at the end (e.g., equivalent to the start of an empty job request group) of the job request group. The job request $J_{VM1}$ is then selected for processing at job executor 136 as shown in FIG. 6B.

Referring to FIG. 6C, a job request $J_{VM2}$ is received from VM2. A job request group $G_{VM2}$ is created for VM2 and positioned at the tail of high priority job queue 152. As shown, the tail of high priority job queue 152 is ahead of any empty job request groups. The job request $J_{VM2}$ is positioned at the end of the job request group $G_{VM2}$, and later selected for processing at job executor 136 as shown in FIG. 6D.

A job request $J_{VM3}$ from VM3 is received and added to a job request group $G_{VM3}$ as shown in FIG. 6E. The job request $J_{VM3}$ is selected for processing at job executor 136 in accordance with FIG. 6F.

Referring again to the multi-level queue structure of FIG. 1B, job queues might be implemented by a collection of first-in, first-out (FIFO) data structures that are implemented in hardware or software. In such cases a job request group is assigned to a corresponding FIFO, and other data structures such as linked lists represent the ordering of job requests groups in the queues. When FIFOs are used to maintain an order for processing the jobs in a job request group, moving a job request group from one position in a queue to another position in a queue can be done with pointers.

In FIG. 6G, a job request $J_{VM1}$ is received from VM1 and placed in the existing job request group $G_{VM1}$. With job request group $G_{VM1}$ now populated, it is positioned at the tail of high priority job queue 152 ahead of the empty job request groups. As can be observed in FIG. 6H, with processing capacity available, job executor 136 selects the job request $J_{VM1}$ from the head of the high priority job queue 152 for processing. Since the count of in-process jobs associated with VM1 is now equal to or greater than the in-process jobs threshold of two, the job request group $G_{VM1}$ associated with VM1 is demoted to low priority job queue 154.

Referring to FIG. 6I, a job request $J_{VM1}$ received from VM1 is placed in the existing job request group $G_{VM1}$ in low priority job queue 154. Since no processing capacity is available, the job request and later received job request, such as the job request from VM1 shown in FIG. 6J, will remain in low priority job queue 154.

When a job (e.g., the job associated with $J_{VM2}$) is completed at job executor 136, as shown in FIG. 6K, processing capacity is available for another job. As such, the high priority job queue 152 is scanned for a job request to select for processing. Since the high priority job queue 152 is empty, the job request at the head of the low priority job queue 154 is selected, as indicated in FIG. 6L. As further indicated in the figure, the job request position of the selected job request is vacated in the job request group $G_{VM1}$ so that the remaining job requests in the group can move forward one position.

As illustrated in FIG. 6M, FIG. 6N, and FIG. 6O, job requests received from VM2, VM3, and VM1, respectively, are added to the end of their respective job request groups.

Referring to FIG. 6P, a job associated with VM1 is completed at job executor 136. As such, the job request $J_{VM2}$ at the head of the high priority job queue 152 is selected for processing, as illustrated in FIG. 6Q. As also shown, the job request group $G_{VM2}$, which is now empty, is positioned behind the job request group $G_{VM3}$, which is populated with at least one job request.

As shown in FIG. 6R, when one of the two jobs associated with VM1 (e.g., referenced as $J_{VM1}$) has completed at job executor 136, the count of in-process jobs for VM1 is reduced to one, which is less than the in-process jobs threshold. As such, the job request group $G_{VM1}$ associated with VM1 is promoted from low priority job queue 154 to high priority job queue 152.

As can be observed in FIG. 6S, with processing capacity available, job executor 136 selects the job request $J_{VM3}$ from the head of the high priority job queue 152 for processing. Since the count of in-process jobs associated with VM3 is now equal to or greater than the in-process jobs threshold of two, the job request group $G_{VM3}$ associated with VM3 is demoted to low priority job queue 154. A new instance of a job request $J_{VM3}$ issued from VM3 will then be placed at the end of the job request group $G_{VM3}$ in low priority job queue 154 as illustrated in FIG. 6T.

Additional Embodiments of the Disclosure

Additional Practical Application Examples

Figure 7:
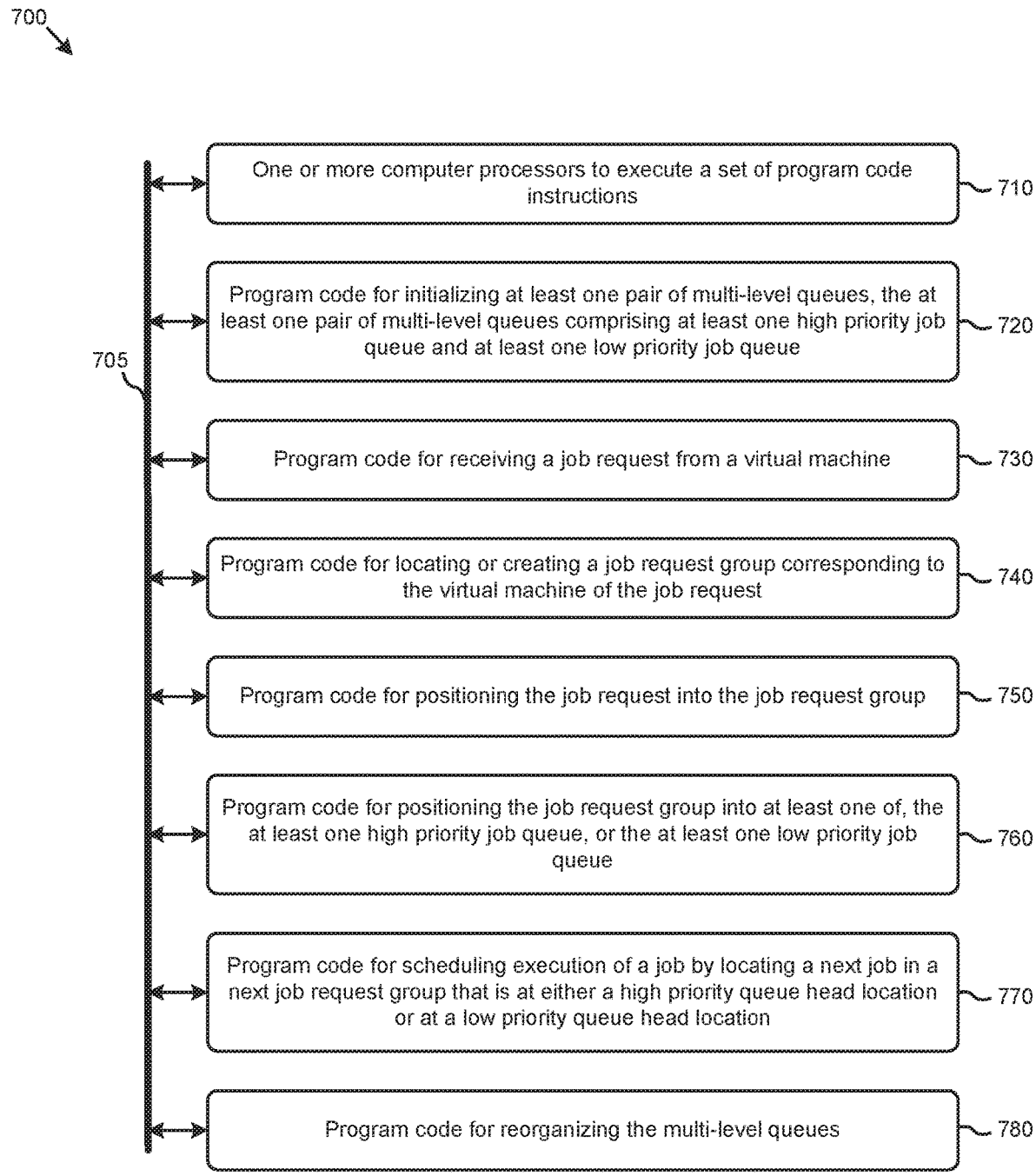
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address managing contention for resources between virtualized entities that considers the then-current resource consumption of the virtualized entities. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: initializing at least one pair of multi-level queues, the at least one pair of multi-level queues comprising at least one high priority job queue and at least one low priority job queue (module 720); receiving a job request from a virtual machine (module 730); locating or creating a job request group corresponding to the virtual machine of the job request (module 740); positioning the job request into the job request group (module 750); positioning the job request group into at least one of, the at least one high priority job queue, or the at least one low priority job queue (module 760); scheduling execution of a job by locating a next job in a next job request group that is at either a high priority queue head location or at a low priority queue head location (module 770); and reorganizing at least a portion of the multi-level queues (module 780).

Variations of the foregoing may include more or fewer of the shown modules. Certain variations may perform more or fewer (or different) steps and/or certain variations may use data elements in more or in fewer (or different) operations. Strictly as examples, some embodiments further comprise selecting at least one of the one or more job requests from the at least one high priority job queue or the at least one low priority job queue; and processing at least one of the one or more jobs that corresponds to the at least one of the one or more job requests. It often happens that at least one of the one or more job requests is selected from a head of the at least one high priority job queue or a head of the at least one low priority job queue. Some embodiments determine a count of one or more in-process jobs, wherein the count is determined based at least in part on the then-current job status. The count can be used to reorganize the contents of the multi-level queues.

In some embodiments, reorganizing the at least one set of multi-level queues comprises demoting at least one of the one or more job requests from the at least one high priority job queue to the at least one low priority job queue and/or promoting at least one of the one or more job requests from the at least one low priority job queue to the at least one high priority job queue. Any one or more request attributes that might be associated with the one or more job requests can serve to describe one or more of, a virtual machine identifier, a node identifier, a job identifier, a timestamp, a job status, or a request status.

Still further, some embodiments include variations in the operations performed, and some embodiments include variations of aspects of the data elements used in the operations.

System Architecture Overview

Additional System Architecture Examples

Figure 8A:
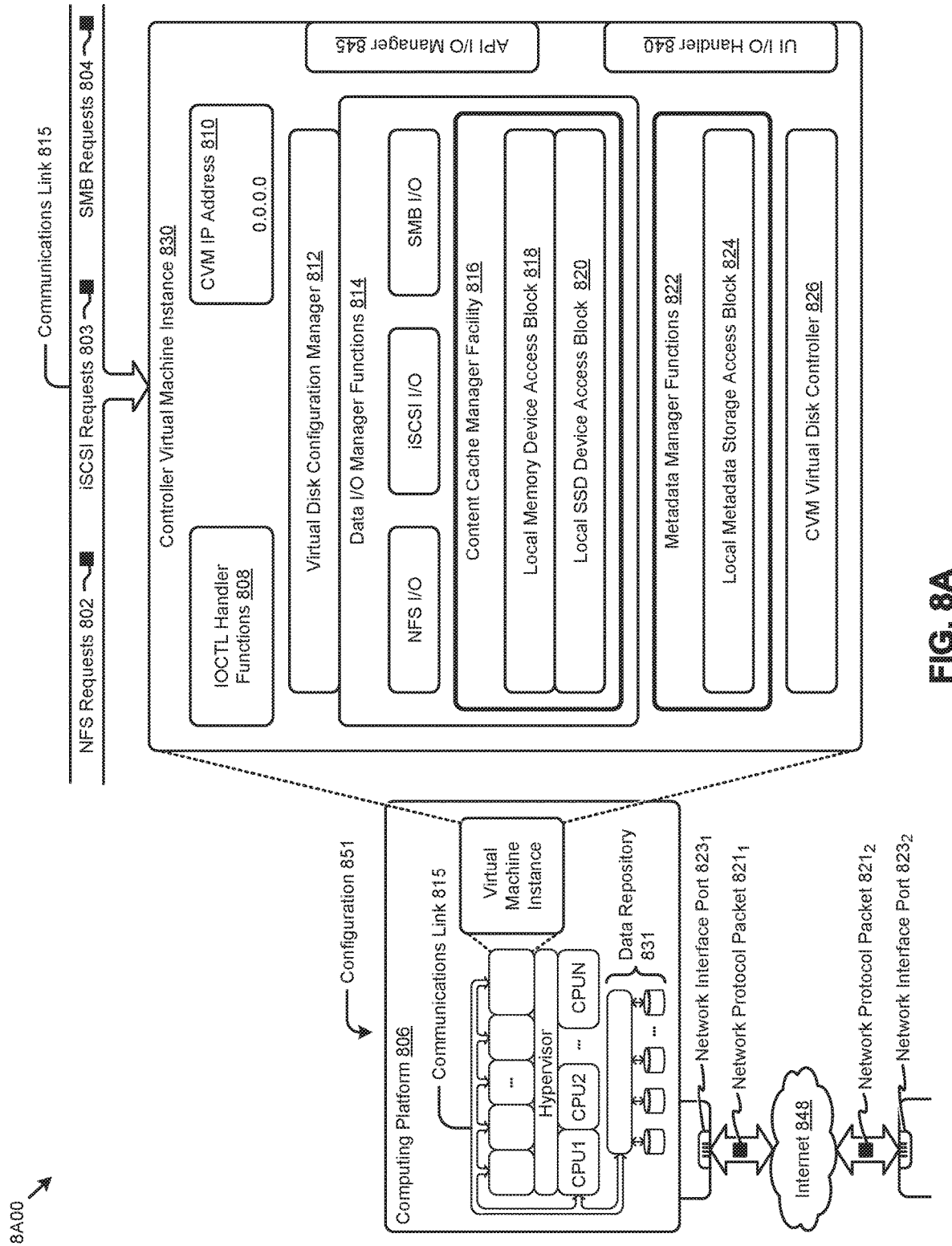
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to forming and maintaining multi-level job queues for scheduling jobs in virtualization environments. In some embodiments, a module may include one or more state machines and/or combinational logic used to implement or facilitate the operational and/or performance characteristics pertaining to forming and maintaining multi-level job queues for scheduling jobs in virtualization environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of forming and maintaining multi-level job queues for scheduling jobs in virtualization environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to multi-level job queues for scheduling jobs in virtualization environments, and/or for improving the way data is manipulated when performing computerized operations pertaining to actively positioning job requests over two or more job queues having respective prioritization levels to facilitate a balanced processing order of jobs.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
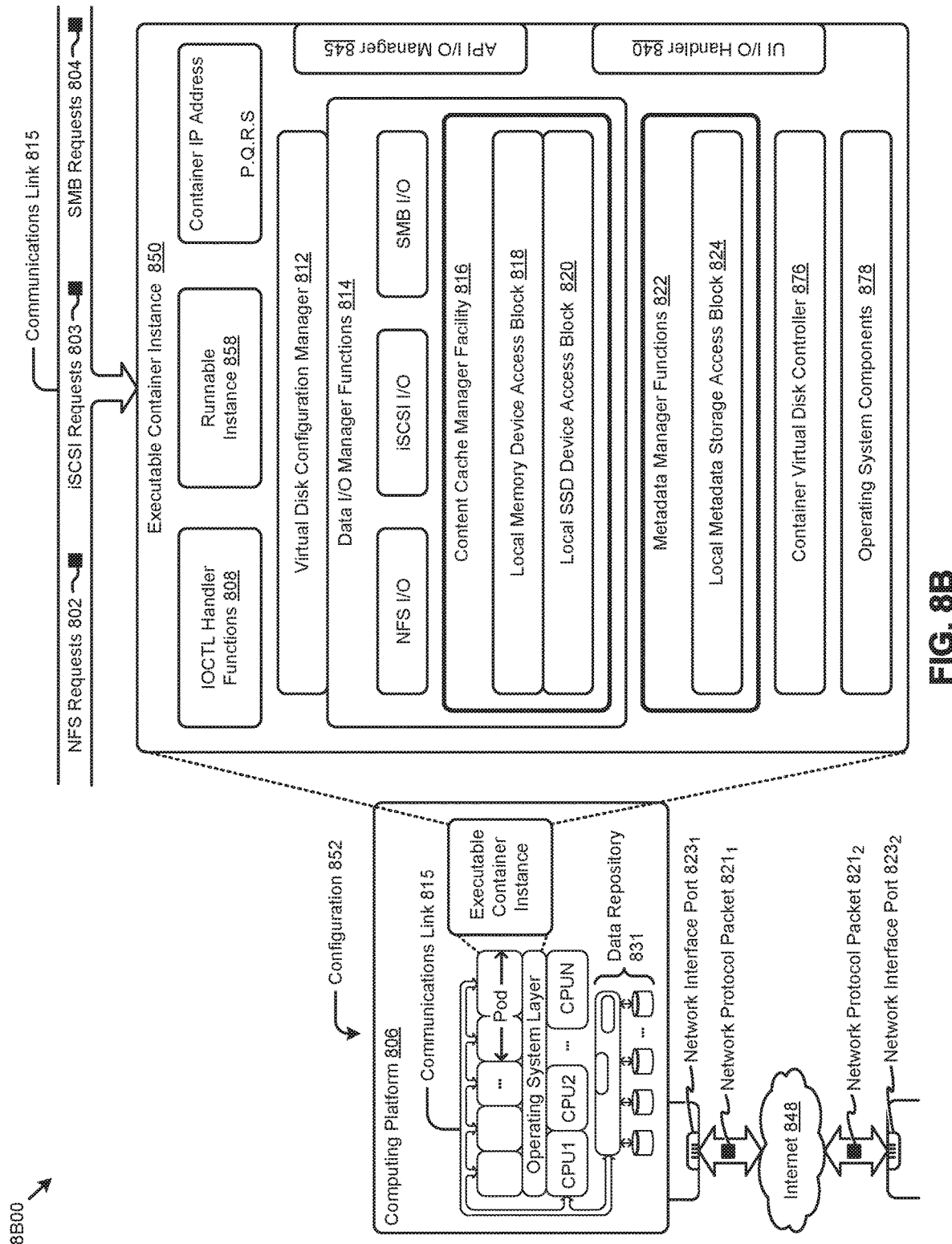

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
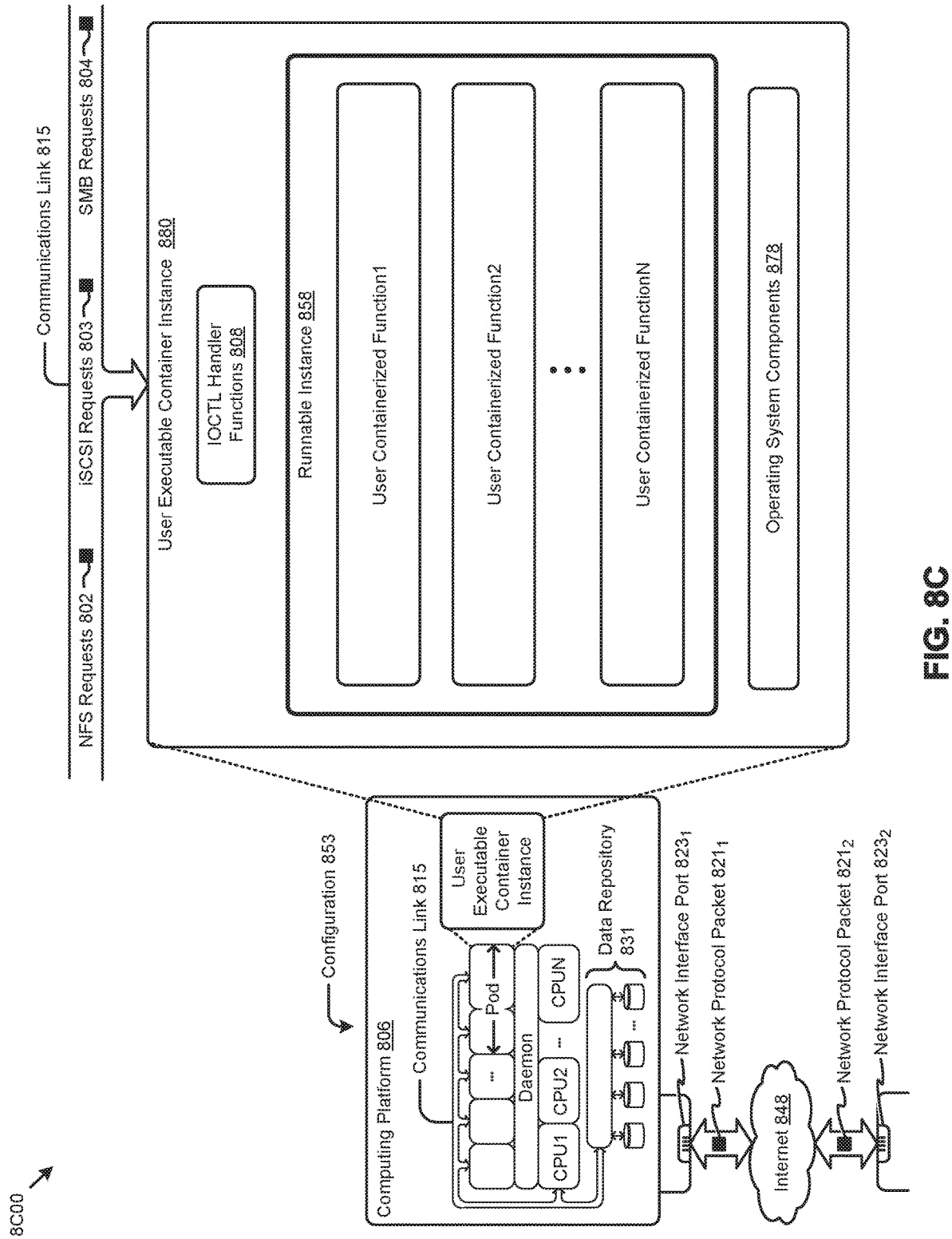

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for scheduling job requests in multi-level job processing queues, the method performed by at least one computer and comprising:
   initializing a multi-level queue, the multi-level queue comprising a high priority job queue and a low priority job queue;
   receiving a job request from an individual virtual machine;
   locating or creating a job request group for the individual virtual machine, wherein the job request group corresponds to the individual virtual machine and different job request groups are created for different respective virtual machines;
   positioning the job request into the job request group for the individual virtual machine;
   positioning the job request group for the individual virtual machine into at least one of, the high priority job queue, or the low priority job queue;
   scheduling execution of a job by locating a next job in a next job request group for the individual virtual machine that is at either a high priority job queue location or at a low priority job queue location; and
   reorganizing the multi-level queue.

2. The method of claim 1, wherein the high priority job queue location comprises a head location in the high priority job queue and the low priority job queue location comprises a head location in the low priority job queue, and scheduling execution of the job comprising locating the job in the head location in the high priority job queue or the head location in the low priority job queue.

3. The method of claim 1, further comprising:
   determining a count of one or more in-process jobs, the count being determined based at least in part on then-current job status, and wherein reorganizing the multi-level queue is based at least in part on the count of the one or more in-process jobs.

4. The method of claim 1, further comprising:
   determining a count of one or more in-process jobs, the count being determined based at least in part on then-current job status, and wherein the count corresponds to a portion of the one or more in-process jobs that is associated with a virtualized entity.

5. The method of claim 1, wherein reorganizing the multi-level queue comprises demoting the job request group from the high priority job queue to the low priority job queue or reorganizing the multi-level queue comprises promoting the job request group from low priority job queue to the high priority job queue.

6. The method of claim 1, wherein the multi-level queue holds a plurality of job request groups, and each group of the job request groups corresponds to an single respective virtual machine.

7. The method of claim 1, wherein a request attribute associated with the job request describes at least one of, a virtual machine identifier, a node identifier, a job identifier, a timestamp, a job status, a request status, or a job attribute.

8. A non-transitory computer readable medium having stored thereon a sequence of instructions which, when stored in memory and executed by a processor causes the processor to perform a process comprising:
   initializing a multi-level queue, the multi-level queue comprising a high priority job queue and a low priority job queue;
   receiving a job request from an individual virtual machine;
   locating or creating a job request group for the individual virtual machine, wherein the job request group corresponds to the individual virtual machine and different job request groups are created for different respective virtual machines;
   positioning the job request into the job request group for the individual virtual machine;
   positioning the job request group for the individual virtual machine into at least one of, the high priority job queue, or the low priority job queue;
   scheduling execution of a job by locating a next job in a next job request group for the individual virtual machine that is at either a high priority job queue location or at a low priority job queue location; and
   reorganizing the multi-level queue.

9. The computer readable medium of claim 8, wherein the high priority job queue location comprises a head location in the high priority job queue and the low priority job queue location comprises a head location in the low priority job queue, and scheduling execution of the job comprising locating the job in the head location in the high priority job queue or the head location in the low priority job queue.

10. The computer readable medium of claim 8, determining a count of one or more in-process jobs, the count being determined based at least in part on then-current job status, and wherein reorganizing the multi-level queue is based at least in part on the count of the one or more in-process jobs.

11. The computer readable medium of claim 8, determining a count of one or more in-process jobs, the count being determined based at least in part on then-current job status, and wherein the count corresponds to a portion of the one or more in-process jobs that is associated with a virtualized entity.

12. The computer readable medium of claim 8, wherein reorganizing the multi-level queue comprises demoting the job request group from the high priority job queue to the low priority job queue or reorganizing the multi-level queue comprises promoting the job request group from low priority job queue to the high priority job queue.

13. The computer readable medium of claim 8, wherein the multi-level queue holds a plurality of job request groups, and each group of the job request groups corresponds to an single respective virtual machine.

14. The computer readable medium of claim 8, wherein a request attribute associated with the job request describes at least one of, a virtual machine identifier, a node identifier, a job identifier, a timestamp, a job status, a request status, or a job attribute.

15. A system for scheduling job requests in multi-level job processing queues, the system comprising:
 a storage medium having stored thereon a sequence of instructions; and
 a processor that execute the sequence of instructions to cause the processor to perform a set of acts, the set of acts comprising,
  initializing a multi-level queue, the multi-level queue comprising a high priority job queue and a low priority job queue;
  receiving a job request from an individual virtual machine;
  locating or creating a job request group for the individual virtual machine, wherein the job request group corresponds to the individual virtual machine and different job request groups are created for different respective virtual machines;
  positioning the job request into the job request group for the individual virtual machine;
  positioning the job request group for the individual virtual machine into at least one of, the high priority job queue, or the low priority job queue;
  scheduling execution of a job by locating a next job in a next job request group for the individual virtual machine that is at either a high priority job queue location or at a low priority job queue location; and
  reorganizing the multi-level queue.

16. The system of claim 15, wherein reorganizing the multi-level queue comprises demoting the job request group from the high priority job queue to the low priority job queue or reorganizing the multi-level queue comprises promoting the job request group from low priority job queue to the high priority job queue.

17. The system of claim 15, wherein the high priority job queue location comprises a head location in the high priority job queue and the low priority job queue location comprises a head location in the low priority job queue, and scheduling execution of the job comprising locating the job in the head location in the high priority job queue or the head location in the low priority job queue.

18. The system of claim 15, wherein the set of acts further comprise determining a count of one or more in-process jobs, the count being determined based at least in part on then-current job status, and wherein reorganizing the multi-level queue is based at least in part on the count of the one or more in-process jobs.

19. The system of claim 15, wherein the set of acts further comprise determining a count of one or more in-process jobs, the count being determined based at least in part on then-current job status, and wherein the count corresponds to a portion of the one or more in-process jobs that is associated with a virtualized entity.

20. The system of claim 15, wherein the multi-level queue holds a plurality of job request groups, and each group of the job request groups corresponds to an single respective virtual machine.

21. The system of claim 15, wherein a request attribute associated with the job request describes at least one of, a virtual machine identifier, a node identifier, a job identifier, a timestamp, a job status, a request status, or a job attribute.

* * * * *